US012804679B2

(12) United States Patent
Park et al.

(10) Patent No.: US 12,804,679 B2
(45) Date of Patent: Nov. 17, 2026

(54) METHOD AND DEVICE FOR OPERATING SIDE LINK DISCONTINUOUS RECEPTION

(71) Applicant: LG ELECTRONICS INC., Seoul (KR)

(72) Inventors: Giwon Park, Seoul (KR); Seoyoung Back, Seoul (KR); Jongwoo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 281 days.

(21) Appl. No.: 18/691,670

(22) PCT Filed: Sep. 13, 2022

(86) PCT No.: PCT/KR2022/013661
§ 371 (c)(1),
(2) Date: Mar. 13, 2024

(87) PCT Pub. No.: WO2023/038504
PCT Pub. Date: Mar. 16, 2023

(65) Prior Publication Data

US 2024/0381383 A1 Nov. 14, 2024

(30) Foreign Application Priority Data

Sep. 13, 2021 (KR) ........................ 10-2021-0121396

(51) Int. Cl.
*H04W 72/25* (2023.01)
*H04W 72/40* (2023.01)
(Continued)

(52) U.S. Cl.
CPC ........... *H04W 72/25* (2023.01); *H04W 72/40* (2023.01); *H04W 76/23* (2018.02); *H04W 76/28* (2018.02);
(Continued)

(58) Field of Classification Search
CPC ....... H04L 1/0001-1896; H04L 5/0001-0098; H04W 4/06-80; H04W 8/22-245;
(Continued)

(56) References Cited

U.S. PATENT DOCUMENTS

2021/0227602 A1 7/2021 Li et al.
2023/0063472 A1* 3/2023 Freda .................... H04W 76/28
2023/0107246 A1* 4/2023 Kang .................... H04W 76/28

FOREIGN PATENT DOCUMENTS

KR 1020210099993 8/2021
WO 2021158060 8/2021

OTHER PUBLICATIONS

European Patent Office Application Serial No. 22867772.0, Search Report dated Sep. 24, 2025, 13 pages.

(Continued)

*Primary Examiner* — Timothy J Weidner
(74) *Attorney, Agent, or Firm* — LEE, HONG, DEGERMAN, KANG & WAIMEY

(57) ABSTRACT

An operation method of a first user equipment (UE) in a wireless communication system according to an embodiment of the present disclosure comprises receiving, from a second UE, sidelink transmission pool information including information on a sidelink transmission pool, selecting a sidelink reception pool related to the sidelink transmission pool based on the sidelink transmission pool information, receiving a physical sidelink control channel (PSCCH) from the second UE based on the sidelink reception pool, and receiving a physical sidelink shared channel (PSSCH) from the second UE based on the sidelink reception pool. One of the sidelink transmission pool or the sidelink reception pool may support a discontinuous reception (DRX) operation.

12 Claims, 20 Drawing Sheets

(51) Int. Cl.

| | |
|---|---|
| ***H04W 76/23*** | (2018.01) |
| ***H04W 76/28*** | (2018.01) |
| ***H04W 84/02*** | (2009.01) |
| ***H04W 88/02*** | (2009.01) |
| ***H04W 92/18*** | (2009.01) |

(52) U.S. Cl.
CPC ............ *H04W 84/02* (2013.01); *H04W 88/02* (2013.01); *H04W 92/18* (2013.01); *Y02D 30/70* (2020.08)

(58) Field of Classification Search
CPC ..... H04W 28/02–26; H04W 48/02–20; H04W 52/02–0296; H04W 72/02–569; H04W 76/10–50; H04W 84/005–22; H04W 88/02–06; H04W 92/16–18; Y02D 30/70
See application file for complete search history.

(56) References Cited

OTHER PUBLICATIONS

Xiaomi Communications, "Discussion on sidelink DRX for unicast," 3GPP TSG-RAN WG2 Meeting #115e, R2-2107969, Aug. 2021, 7 pages.
PCT International Application No. PCT/KR2022/013661, International Search Report dated Jan. 2, 2023, 2 pages.
LG Electronics Inc., "Further discussion on Sidelink DRX," 3GPP TSG-RAN WG2 Meeting #114-e, R2-2105297, May 2021, 6 pages.
LG Electronics Inc., "Further discussion on Sidelink/Uu DRX timer," 3GPP TSG-RAN WG2 Meeting #115-e, R2-2107242, Aug. 2021, 6 pages.
Oppo, "Left issues on SL-DRX," 3GPP TSG-RAN WG2 #115-e, R2-2108830, Aug. 2021, 13 pages.
Spreadtrum Communications., "Remaining issues on DRX timers for SL Unicast," 3GPP TSG-RAN WG2 Meeting #115-e, R2-2107355, Aug. 2021, 5 pages.
Korean Intellectual Property Office Application No. 10-2024-7008142, Office Action dated Jan. 29, 2026, 5 pages.
LG Electronics, "Summary for AI 8.11.2.2 Feasibility and benefits for mode 2 enhancements," 3GPP TSG RAN WG1 #102-e, R1-2007412, Mar. 2020, 33 pages.

* cited by examiner

【FIG. 1】
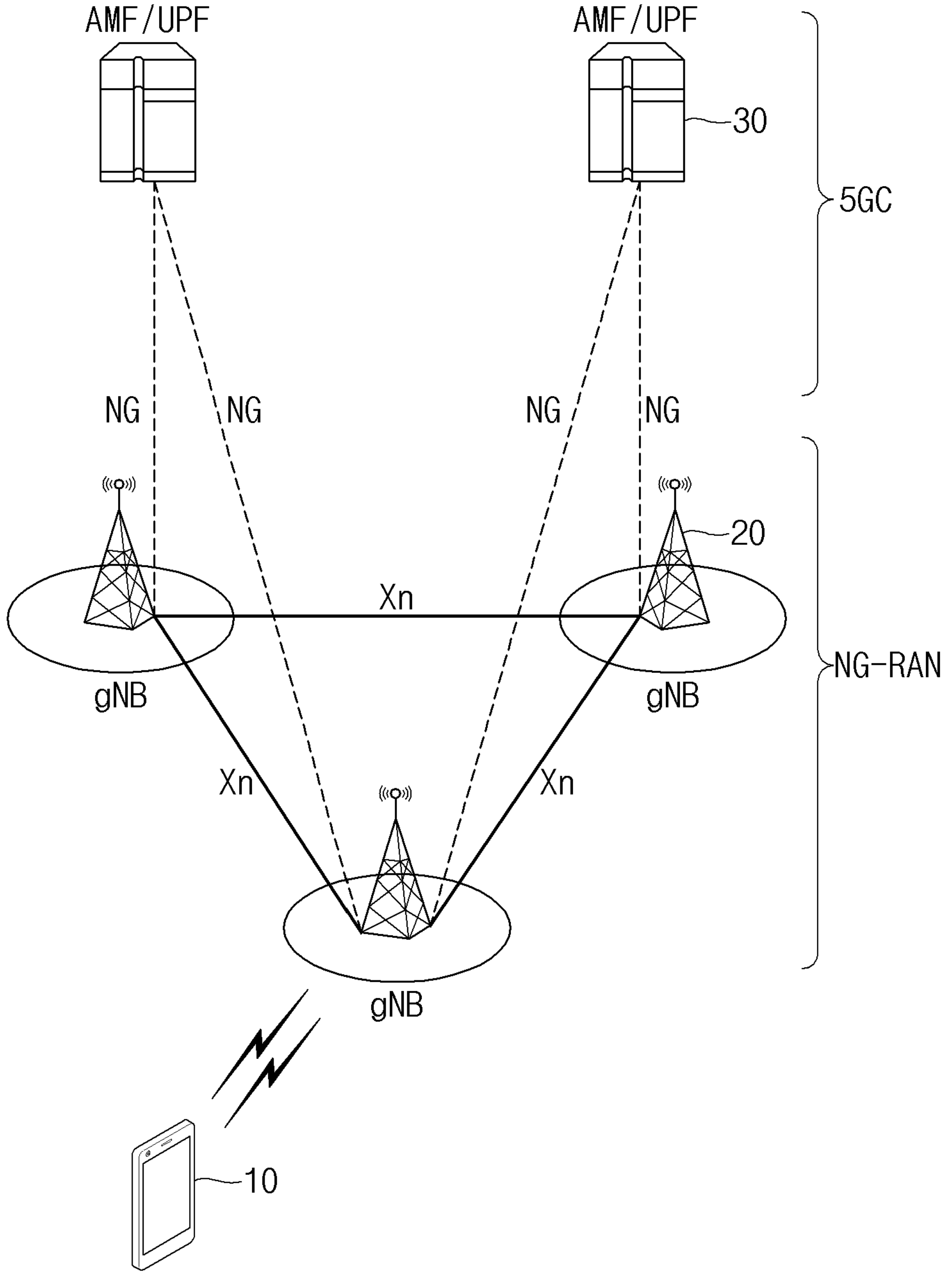

【FIG. 2】
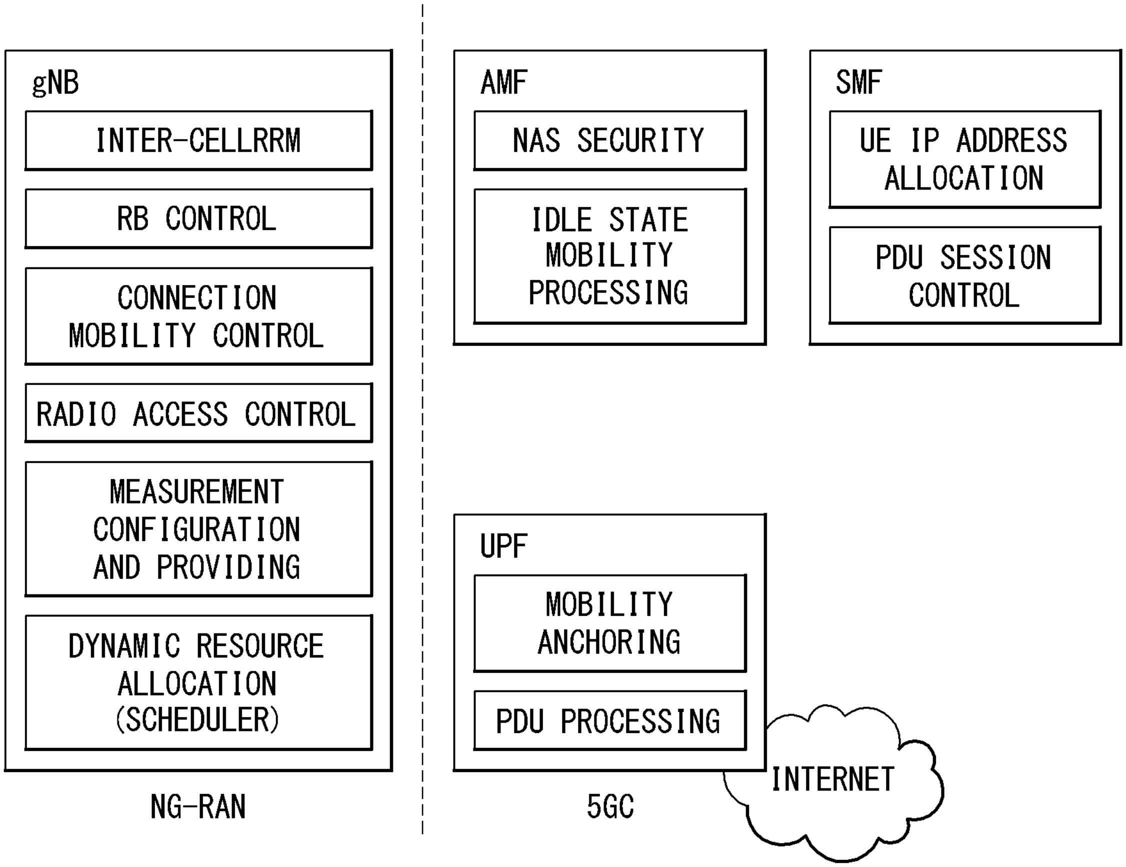

【FIG. 3】
(a)
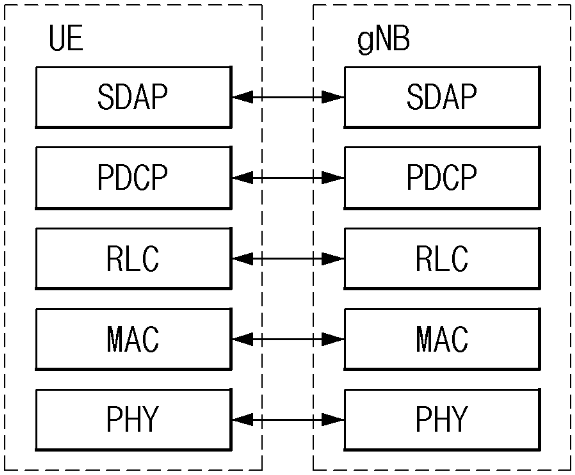
(b)
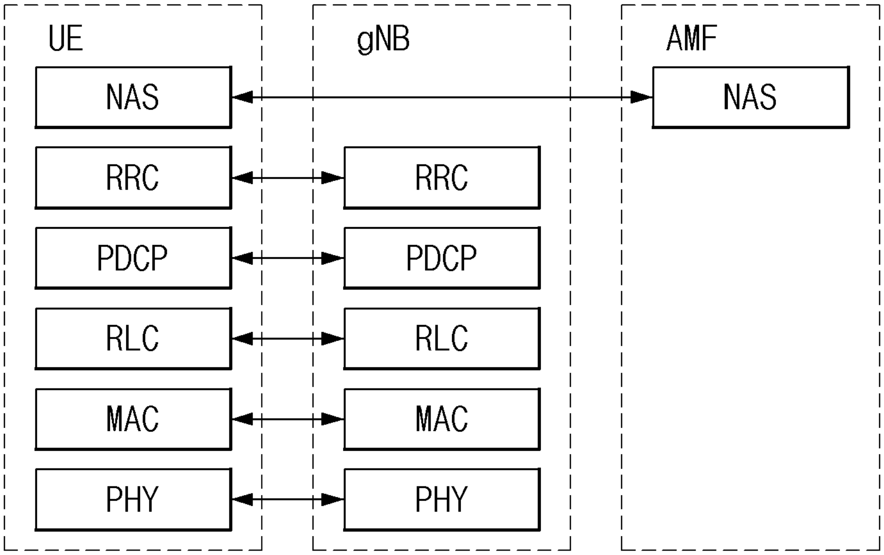

【FIG. 4】
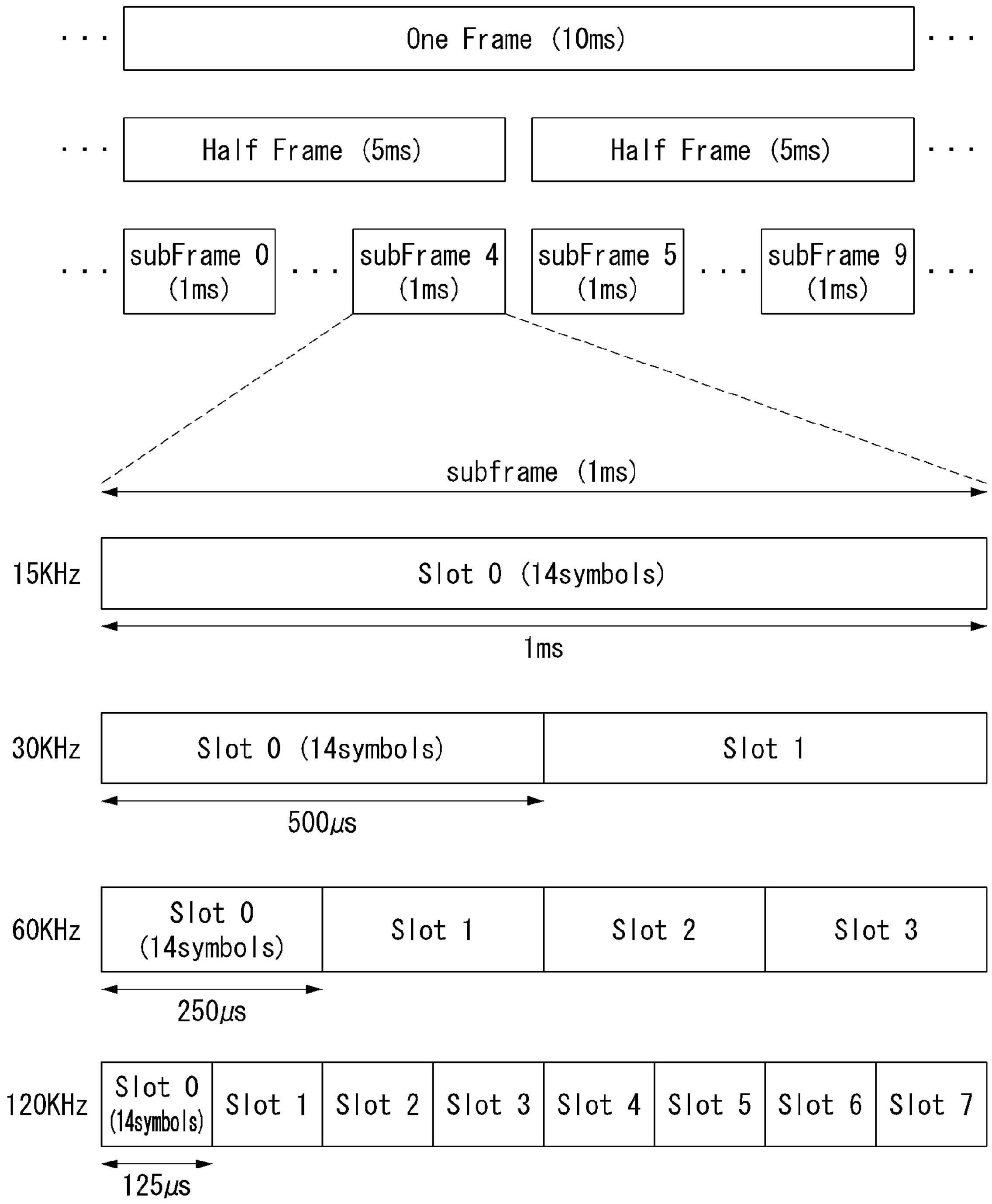

【FIG. 5】
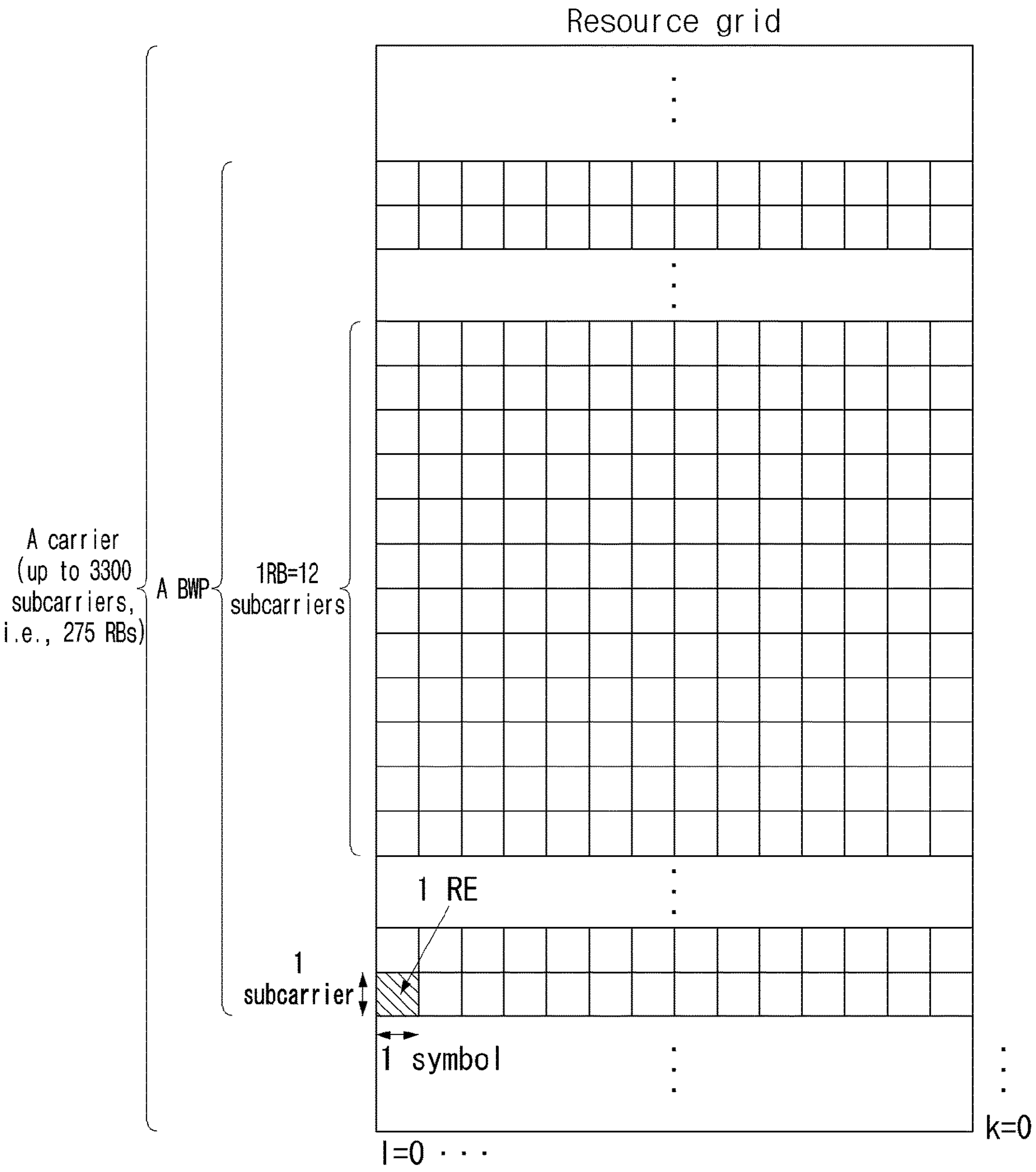

【FIG. 6】
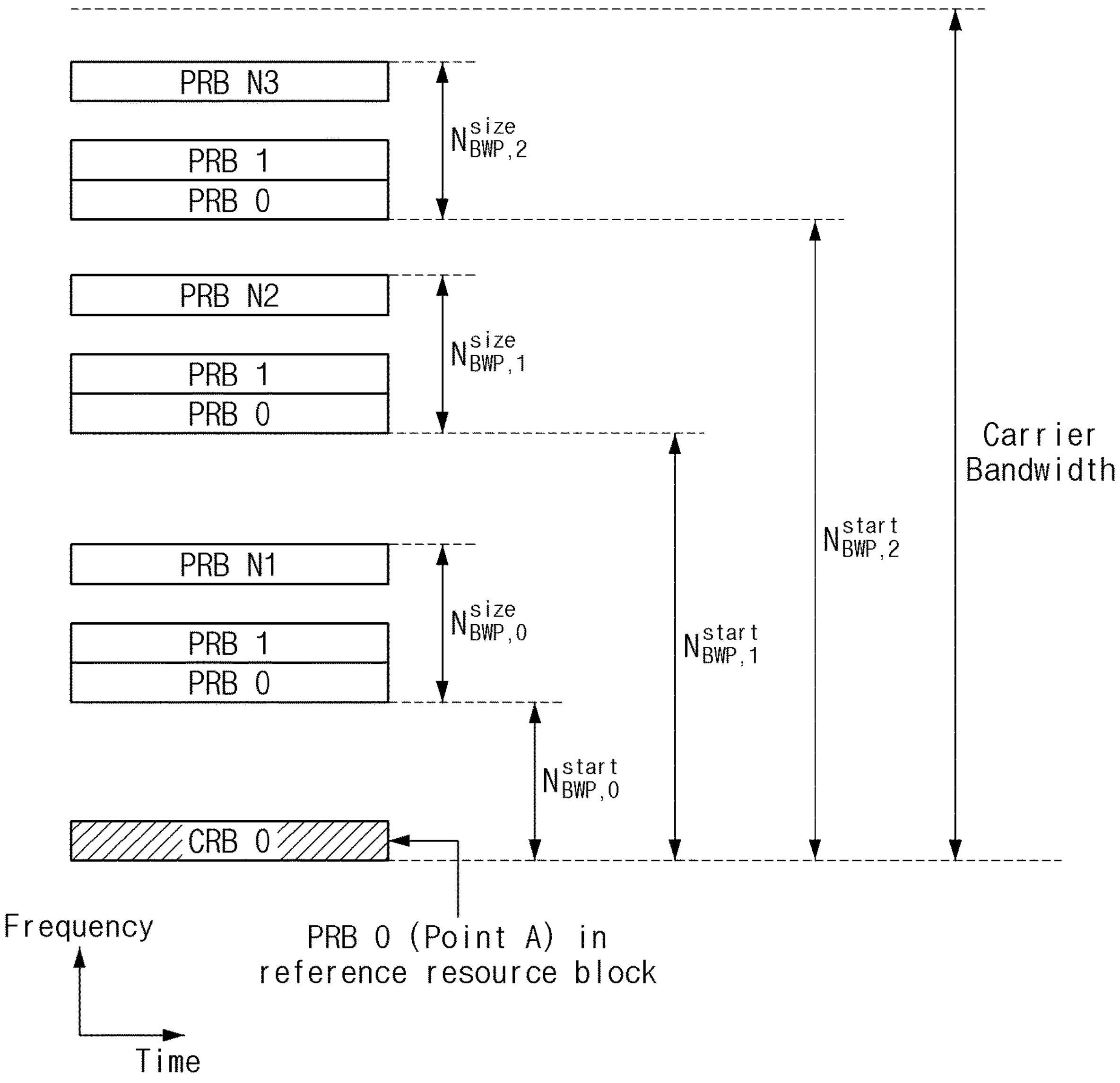

【FIG. 7】
(a)
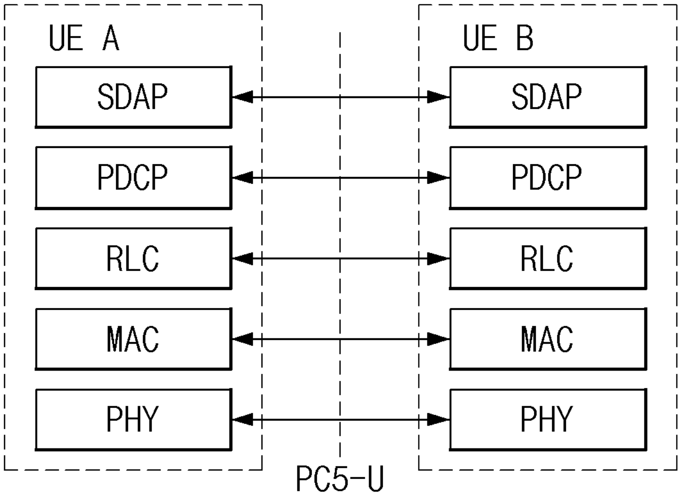
(b)
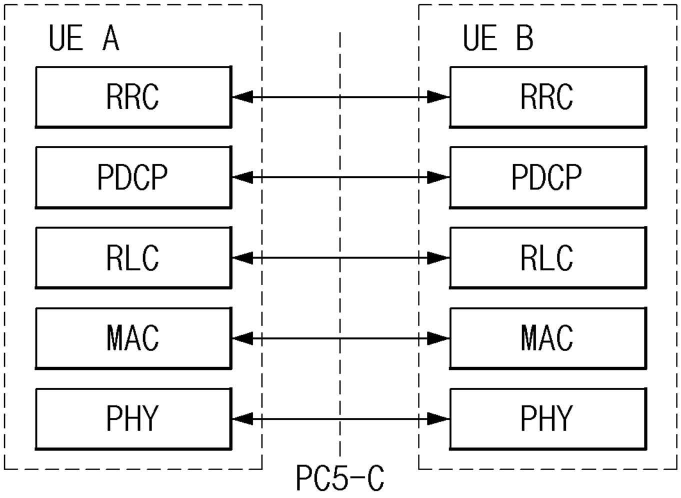

【FIG. 8】
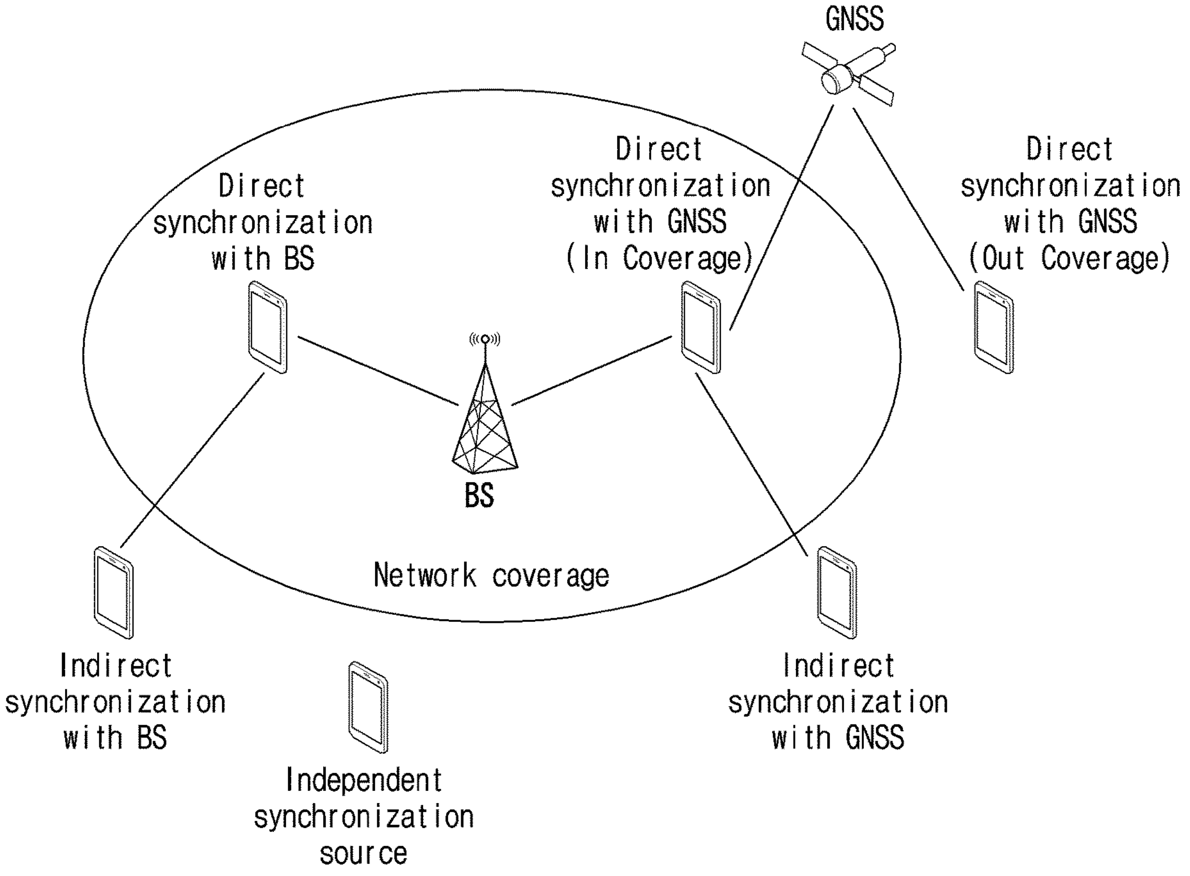

【FIG. 9】
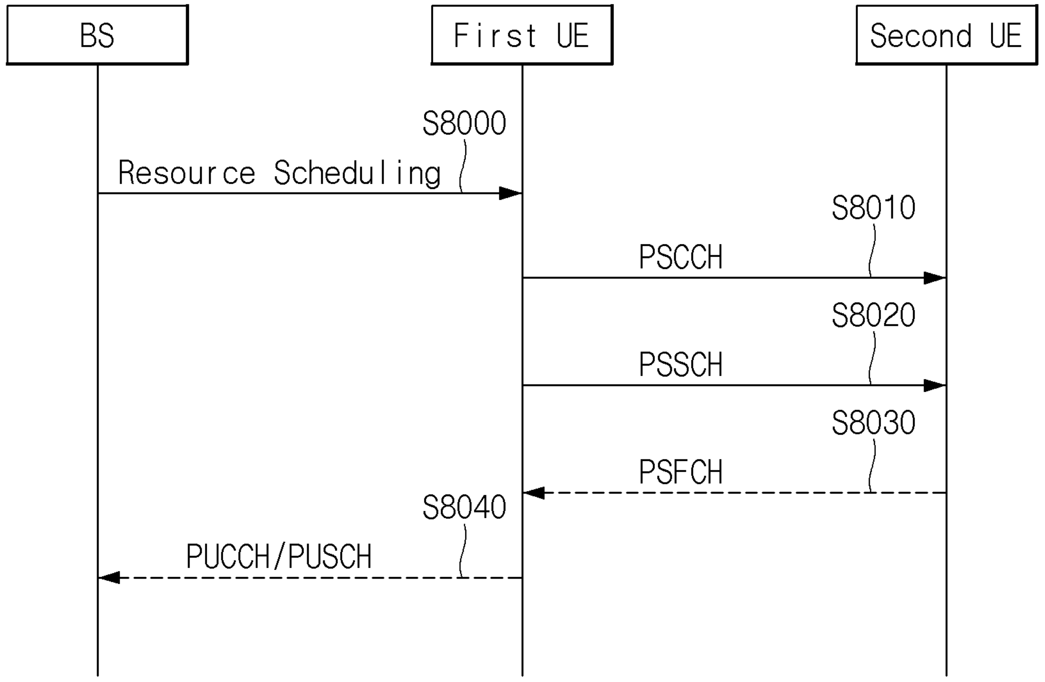
(a)
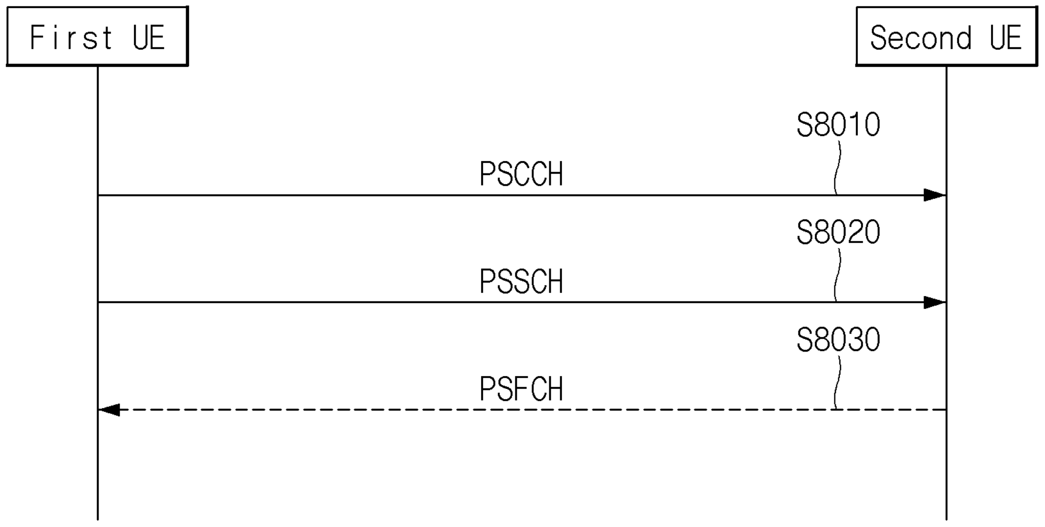
(b)

【FIG. 10】
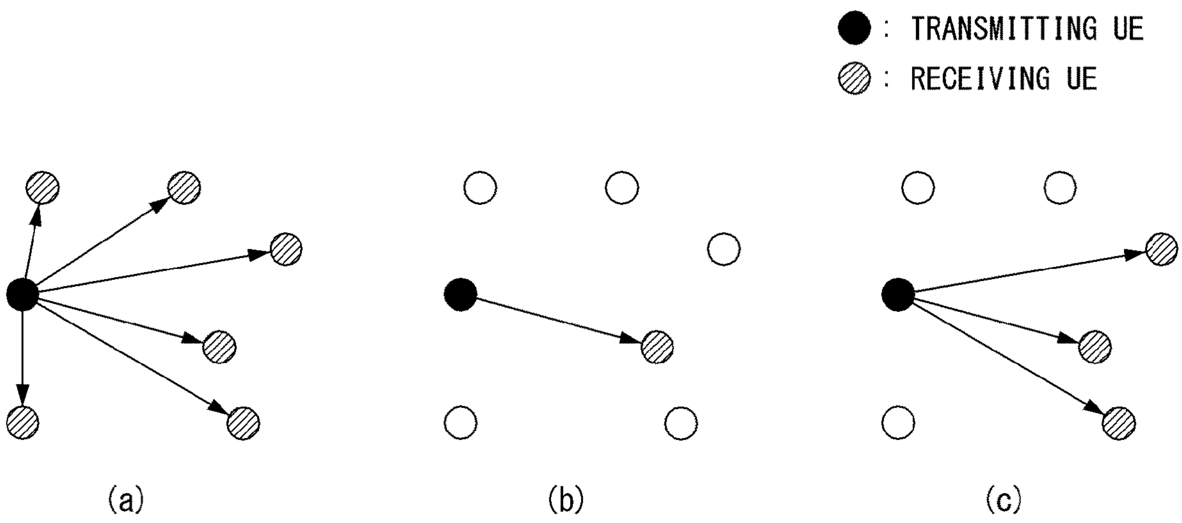
【FIG. 11】
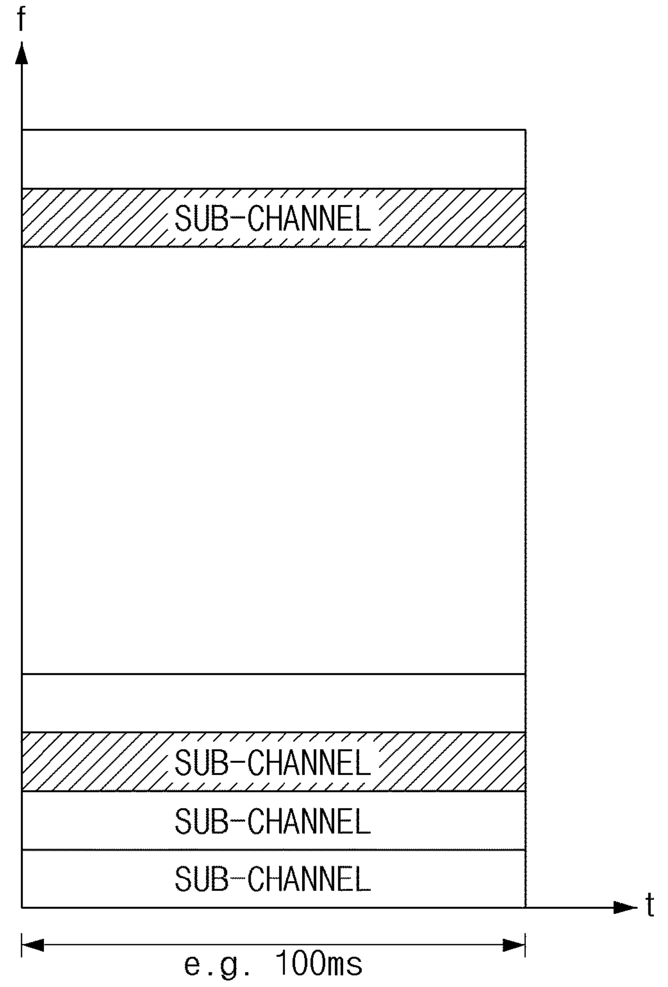

【FIG. 12】
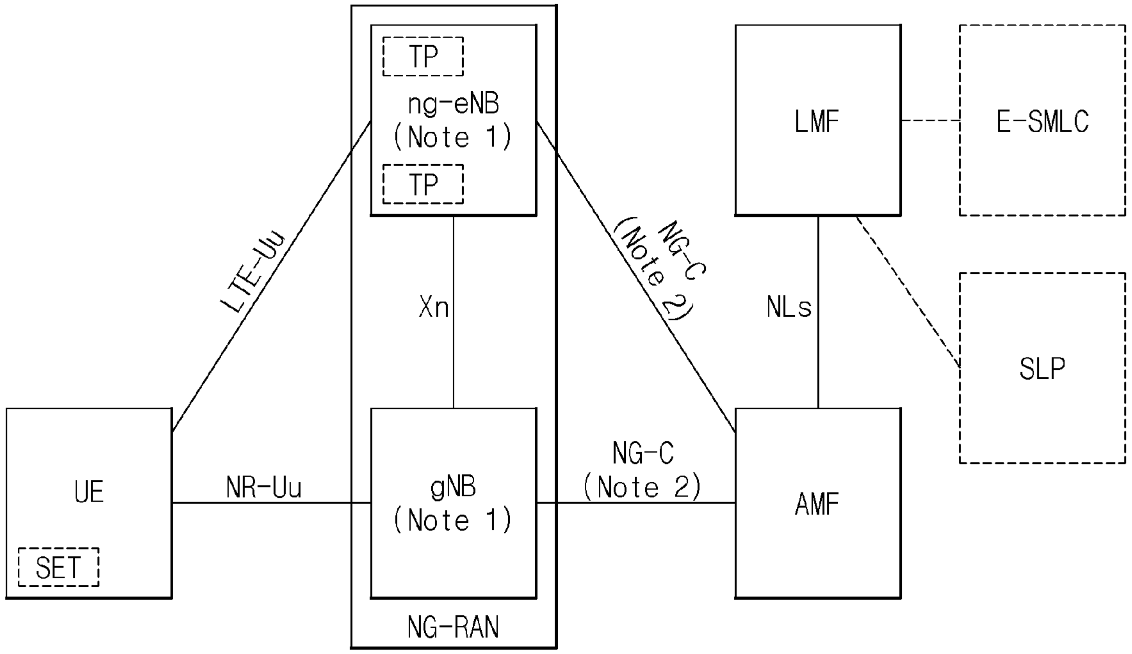

【FIG. 13】
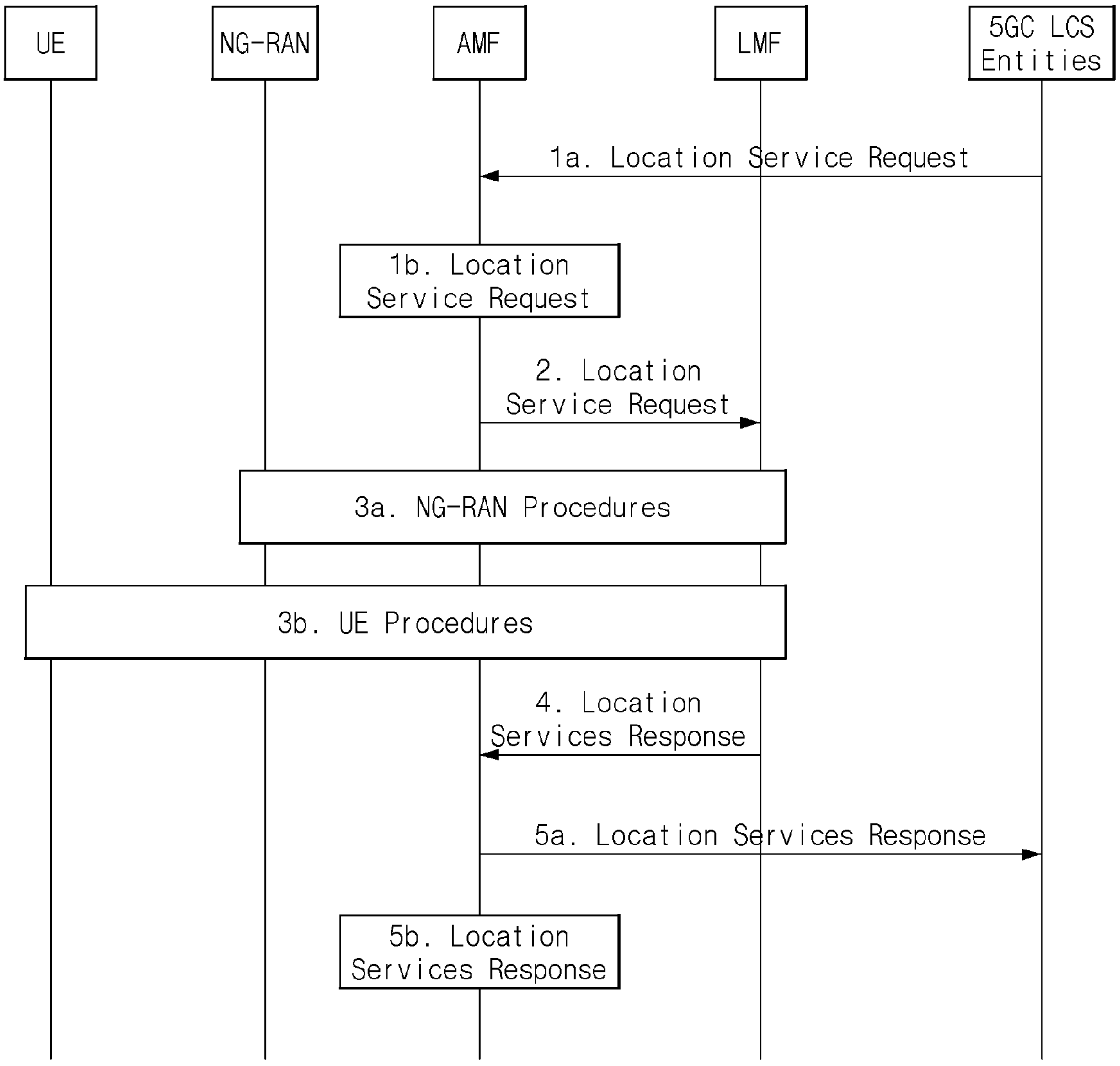

【FIG. 14】
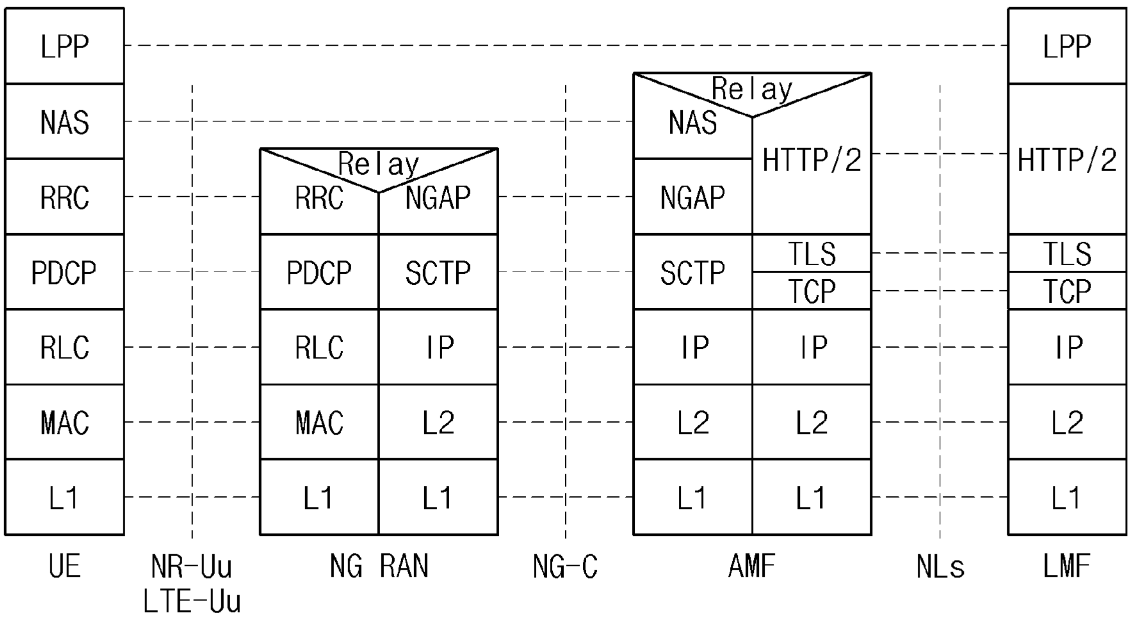
【FIG. 15】
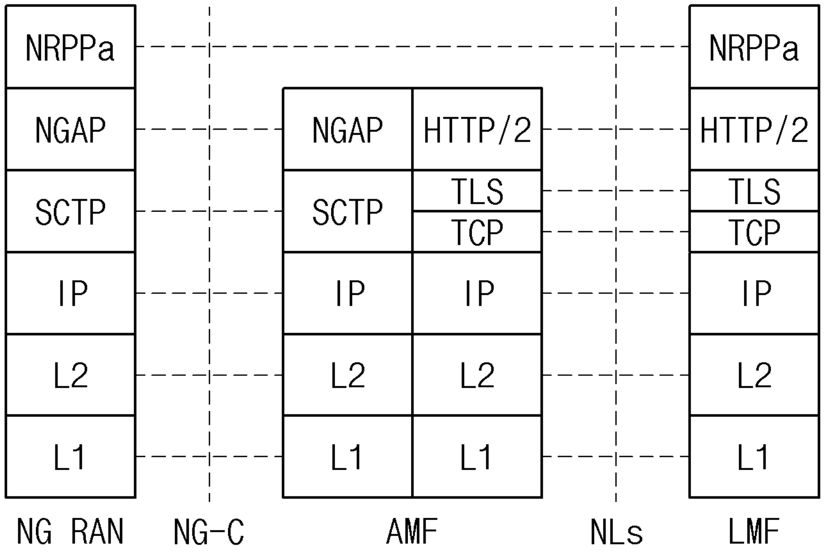

【FIG. 16】
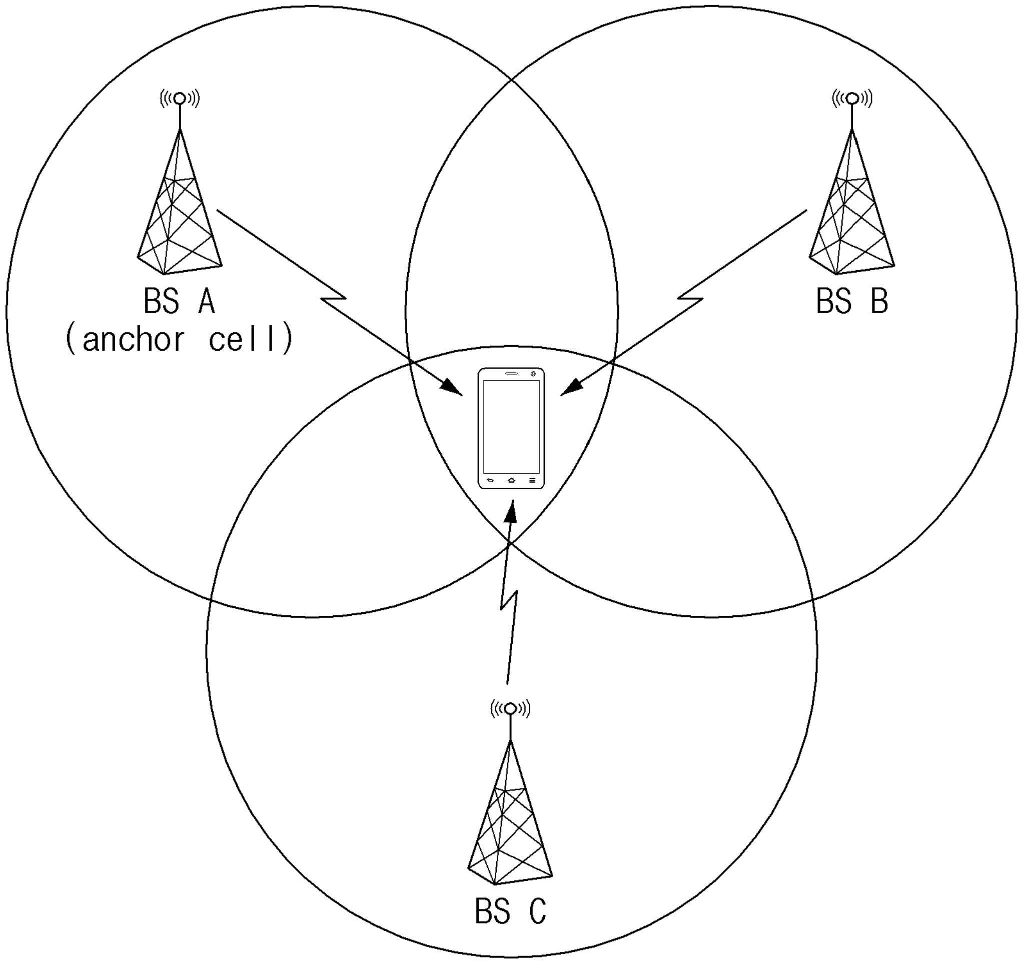

【FIG. 17】
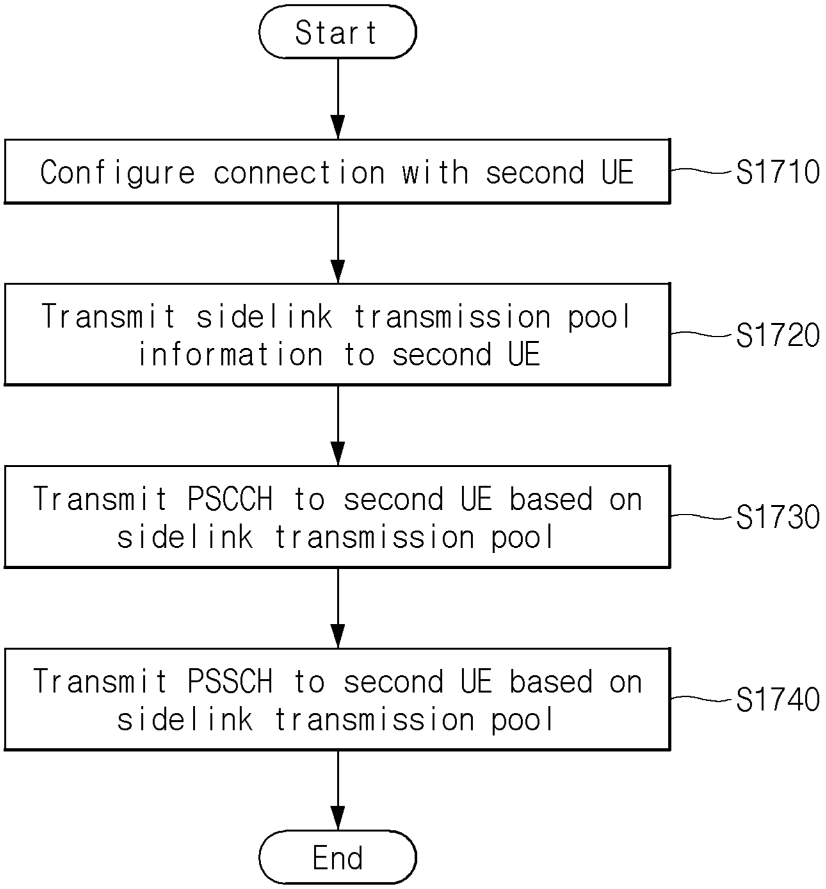

【FIG. 18】
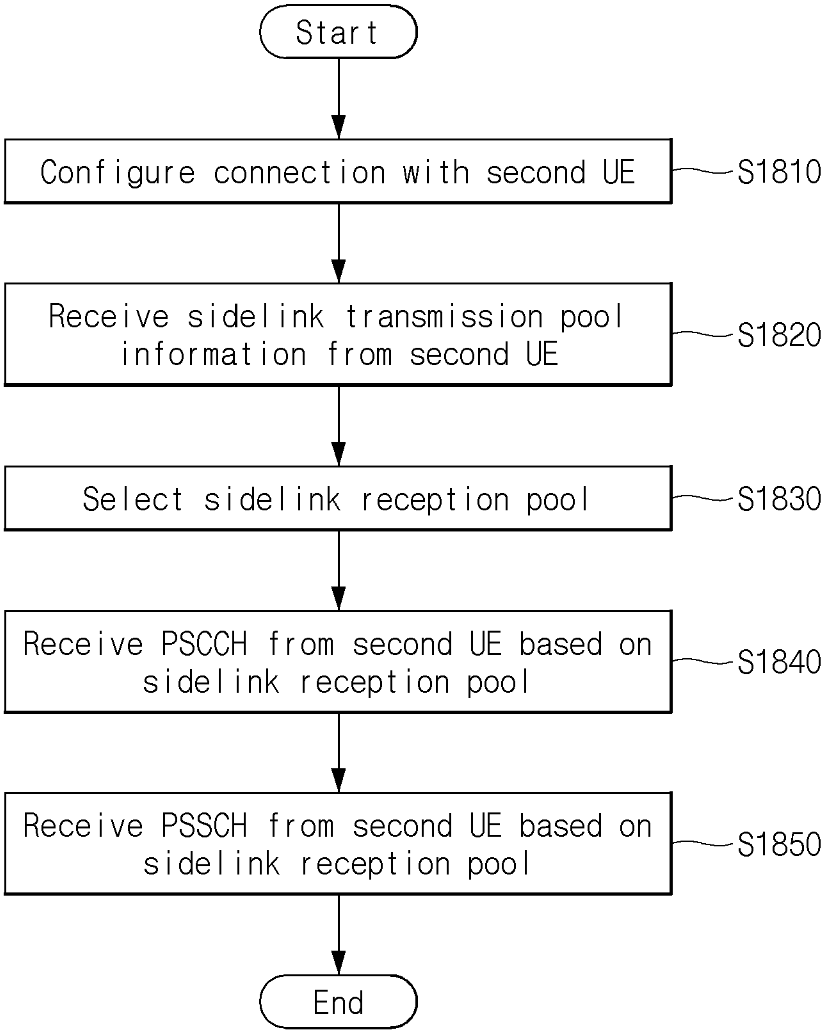

【FIG. 19】
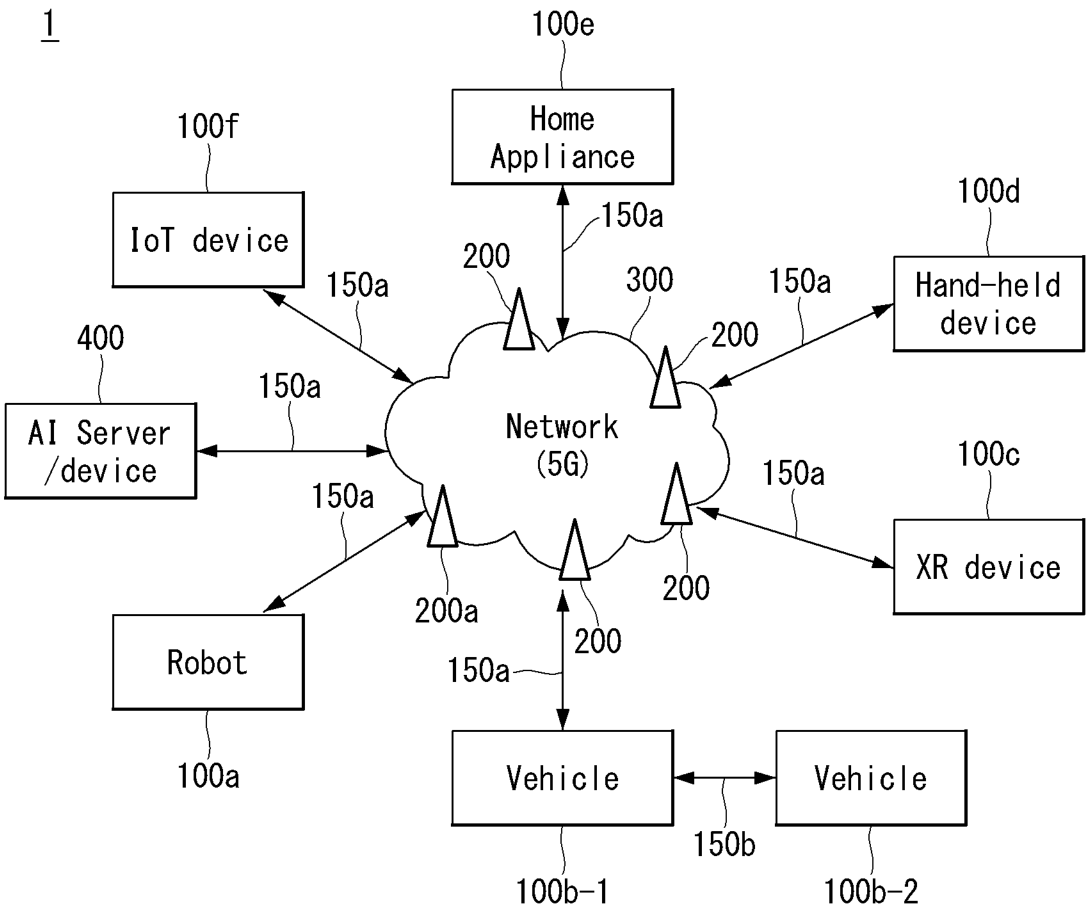
【FIG. 20】
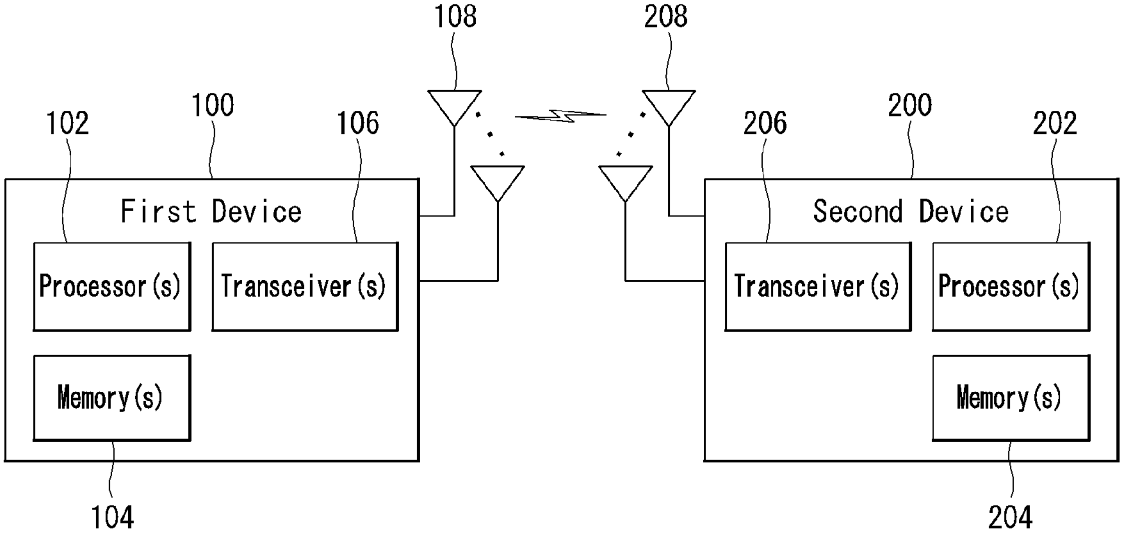

【FIG. 21】
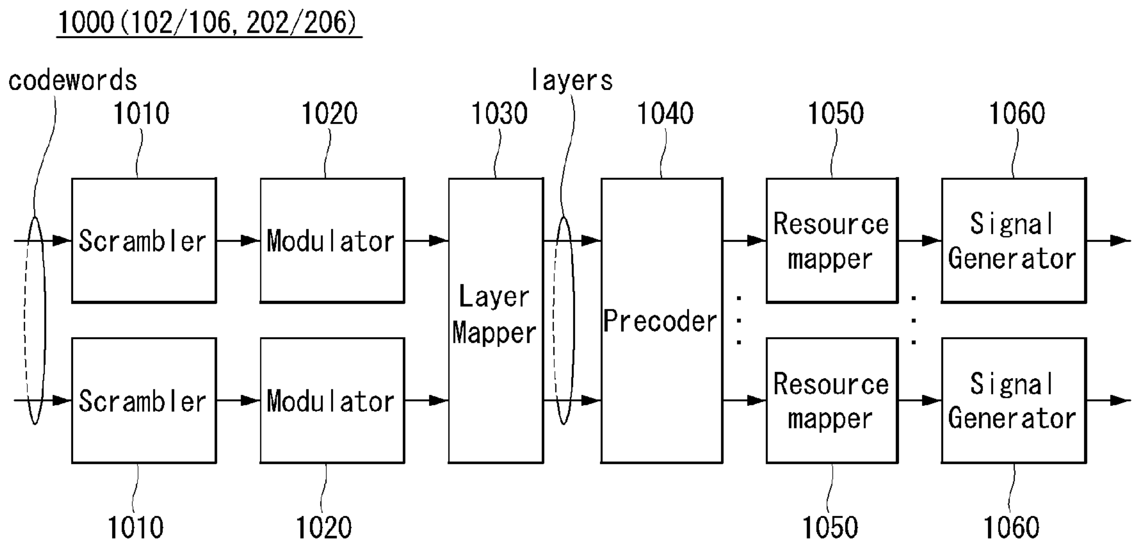
【FIG. 22】
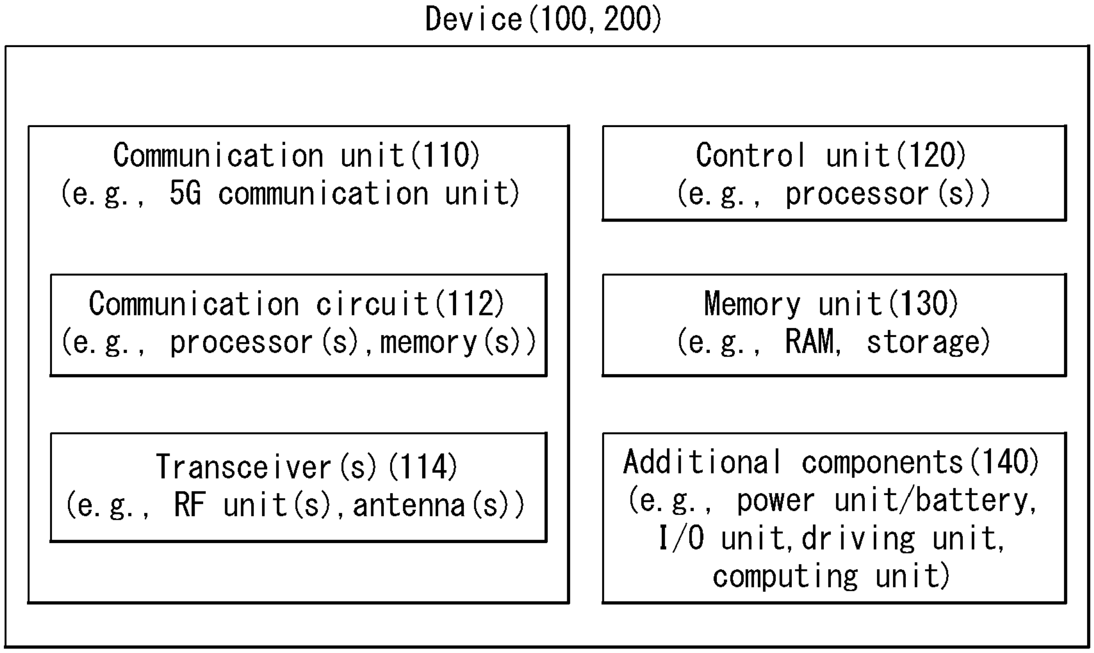

【FIG. 23】
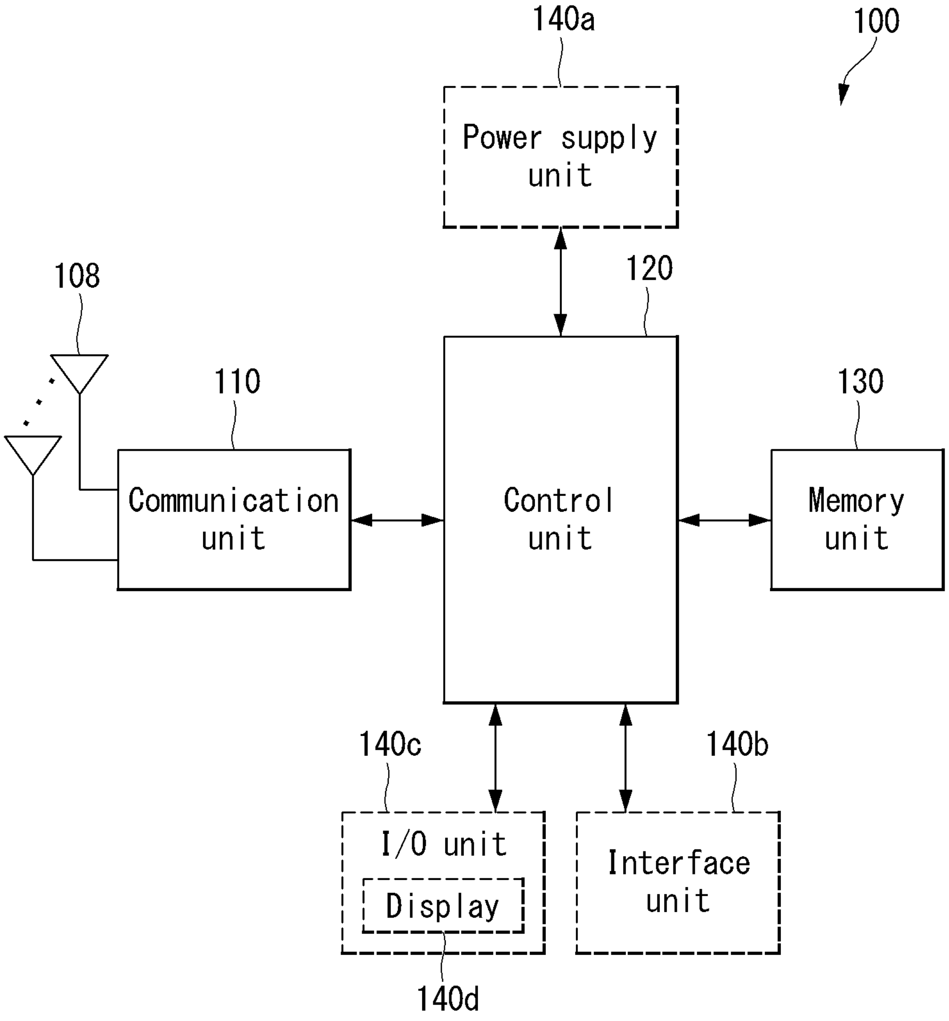

【FIG. 24】
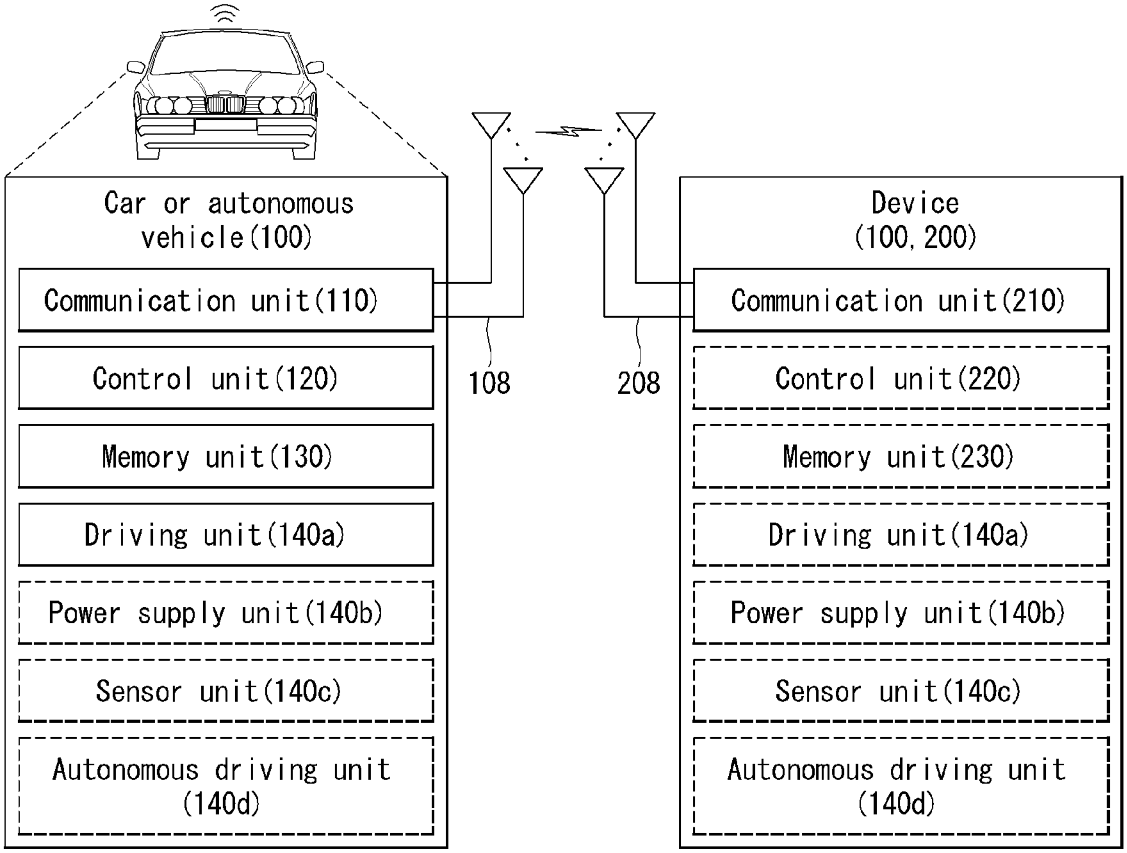

METHOD AND DEVICE FOR OPERATING SIDE LINK DISCONTINUOUS RECEPTION

CROSS-REFERENCE TO RELATED APPLICATION(S)

This application is the National Stage filing under 35 U.S.C. 371 of International Application No. PCT/KR2022/013661, filed on Sep. 13, 2022, which claims the benefit of earlier filing date and right of priority to Korean Application No. 10-2021-0121396, filed on Sep. 13, 2021, the contents of which are all incorporated by reference herein in their entirety.

TECHNICAL FIELD

The present disclosure relates to a method and device for a sidelink discontinuous reception operation, and more particularly to a method and device for a sidelink discontinuous reception operation for transmitting and receiving a resource pool.

BACKGROUND ART

A wireless communication system is a multiple access system that supports communication of multiple users by sharing available system resources (e.g., a bandwidth, transmission power, etc.) among them. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

As more and more communication devices require larger communication capacity, there is a need for improved mobile broadband communication compared to the existing radio access technology (RAT). Hence, communication systems considering services or user equipments (UEs) sensitive to reliability and latency are being discussed, and the next generation radio access technology considering enhanced mobile broadband communication, massive machine type communication (MTC), ultra-reliable and low latency communication (URLLC), etc. may be called new radio access technology (RAT) or new radio (NR). Vehicle-to-everything (V2X) communication can be supported in NR.

DISCLOSURE

Technical Problem

The present disclosure relates to a sidelink discontinuous reception operation based on a sidelink resource pool between a transmitting UE and a receiving UE in a wireless communication system.

The present disclosure relates to a sidelink discontinuous reception operation performed by a receiving UE using a sidelink reception pool corresponding to a sidelink transmission pool in a wireless communication system.

The technical objects to be achieved by the present disclosure are not limited to those that have been described hereinabove merely by way of example, and other technical objects that are not mentioned can be clearly understood by those skilled in the art, to which the present disclosure pertains, from the following descriptions.

Technical Solution

An operation method of a first user equipment (UE) in a wireless communication system according to an embodiment of the present disclosure comprises receiving, from a second UE, sidelink transmission pool information including information on a sidelink transmission pool, selecting a sidelink reception pool related to the sidelink transmission pool based on the sidelink transmission pool information, receiving a physical sidelink control channel (PSCCH) from the second UE based on the sidelink reception pool, and receiving a physical sidelink shared channel (PSSCH) from the second UE based on the sidelink reception pool, wherein one of the sidelink transmission pool or the sidelink reception pool supports a discontinuous reception (DRX) operation.

The operation method may further comprise configuring a unicast connection or a PC5 radio resource control (RRC) connection with the second UE.

Receiving the sidelink transmission pool information from the second UE may comprise receiving the sidelink transmission pool information from the second UE based on a PC5 RRC message or a sidelink MAC control element (CE).

Receiving the sidelink transmission pool information from the second UE may comprise receiving the sidelink transmission pool information from the second UE based on a sidelink capability negotiation, a PC5 RRC reconfiguration, or a sidelink DRX configuration.

The sidelink DRX configuration may include at least one of SL drx-onDurationTimer, SL drx-SlotOffset, SL drx-InactivityTimer, SL drx-StartOffset, SL drx-Cycle, SL drx-HARQ-RTT-Timer or SL drx-Retransmission Timer.

The sidelink transmission pool information may further include at least one of whether the sidelink transmission pool supports a discontinuous reception (DRX), transmission profile information linked to the sidelink transmission pool or quality of service (QOS) profile information linked to the sidelink transmission pool, unicast link information, groupcast service information or broadcast service information to which the sidelink transmission pool is applied, or DRX configuration information linked to the sidelink transmission pool.

A first user equipment (UE) operating in a wireless communication system according to an embodiment of the present disclosure comprises one or more transceivers, one or more processors configured to control the one or more transceivers, and a memory including one or more instructions performed by the one or more processors, wherein the one or more instructions comprise receiving, from a second UE, sidelink transmission pool information including information on a sidelink transmission pool, selecting a sidelink reception pool related to the sidelink transmission pool based on the sidelink transmission pool information, receiving a physical sidelink control channel (PSCCH) from the second UE based on the sidelink reception pool, and receiving a physical sidelink shared channel (PSSCH) from the second UE based on the sidelink reception pool, wherein one of the sidelink transmission pool or the sidelink reception pool supports a discontinuous reception (DRX) operation.

The one or more instructions may further comprise configuring a unicast connection or a PC5 radio resource control (RRC) connection with the second UE.

Receiving the sidelink transmission pool information from the second UE may comprise receiving the sidelink transmission pool information from the second UE based on a PC5 RRC message or a sidelink MAC control element (CE).

Receiving the sidelink transmission pool information from the second UE may comprise receiving the sidelink transmission pool information from the second UE based on a sidelink capability negotiation, a PC5 RRC reconfiguration, or a sidelink DRX configuration.

The sidelink DRX configuration may include at least one of SL drx-onDurationTimer, SL drx-SlotOffset, SL drx-InactivityTimer, SL drx-StartOffset, SL drx-Cycle, SL drx-HARQ-RTT-Timer or SL drx-Retransmission Timer.

The sidelink transmission pool information may further include at least one of whether the sidelink transmission pool supports a discontinuous reception (DRX), transmission profile information linked to the sidelink transmission pool or quality of service (QOS) profile information linked to the sidelink transmission pool, unicast link information, groupcast service information or broadcast service information to which the sidelink transmission pool is applied, or DRX configuration information linked to the sidelink transmission pool.

An operation method of a first user equipment (UE) in a wireless communication system according to an embodiment of the present disclosure comprises transmitting, to a second UE, sidelink transmission pool information including information on a sidelink transmission pool, transmitting a physical sidelink control channel (PSCCH) to the second UE based on the sidelink transmission pool, and transmitting a physical sidelink shared channel (PSSCH) to the second UE based on the sidelink transmission pool, wherein one of the first UE or the second UE supports a sidelink discontinuous reception (DRX) operation.

A first user equipment (UE) operating in a wireless communication system according to an embodiment of the present disclosure comprises one or more transceivers, one or more processors configured to control the one or more transceivers, and a memory including one or more instructions performed by the one or more processors, wherein the one or more instructions comprise transmitting, to a second UE, sidelink transmission pool information including information on a sidelink transmission pool, transmitting a physical sidelink control channel (PSCCH) to the second UE based on the sidelink transmission pool, and transmitting a physical sidelink shared channel (PSSCH) to the second UE based on the sidelink transmission pool, wherein one of the first UE or the second UE supports a sidelink discontinuous reception (DRX) operation.

A device according to an embodiment of the present disclosure comprises one or more memories and one or more processors operably connected to the one or more memories, wherein the one or more processors are configured to allow the device to receive, from a second user equipment (UE), sidelink transmission pool information including information on a sidelink transmission pool, select a sidelink reception pool related to the sidelink transmission pool based on the sidelink transmission pool information, receive a physical sidelink control channel (PSCCH) from the second UE based on the sidelink reception pool, and receive a physical sidelink shared channel (PSSCH) from the second UE based on the sidelink reception pool, wherein one of the sidelink transmission pool or the sidelink reception pool supports a discontinuous reception (DRX) operation.

In one or more non-transitory computer readable mediums storing one or more instructions according to an embodiment of the present disclosure, the one or more instructions comprise receiving, from a second user equipment (UE), sidelink transmission pool information including information on a sidelink transmission pool, selecting a sidelink reception pool related to the sidelink transmission pool based on the sidelink transmission pool information, receiving a physical sidelink control channel (PSCCH) from the second UE based on the sidelink reception pool, and receiving a physical sidelink shared channel (PSSCH) from the second UE based on the sidelink reception pool, and one of the sidelink transmission pool or the sidelink reception pool supports a discontinuous reception (DRX) operation.

Advantageous Effects

According to the present disclosure, a receiving UE can reduce power consumption by performing a sidelink discontinuous reception operation using a sidelink reception pool corresponding to a sidelink transmission pool.

Effects that could be achieved with the present disclosure are not limited to those that have been described hereinabove merely by way of example, and other effects and advantages of the present disclosure will be more clearly understood from the following description by a person skilled in the art to which the present disclosure pertains.

DESCRIPTION OF DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 1 illustrates a structure of an NR system according to an embodiment of the present disclosure.

FIG. 2 illustrates a functional split between NG-RAN and 5GC according to an embodiment of the present disclosure.

FIG. 3 illustrates wireless protocol architecture according to an embodiment of the present disclosure.

FIG. 4 illustrates a structure of a radio frame of an NR according to an embodiment of the present disclosure.

FIG. 5 illustrates a structure of a slot of an NR frame according to an embodiment of the present disclosure.

FIG. 6 illustrates BWPs according to an embodiment of the present disclosure.

FIG. 7 illustrates wireless protocol architecture for SL communication according to an embodiment of the present disclosure.

FIG. 8 illustrates a synchronization source or a synchronization reference of V2X according to an embodiment of the present disclosure.

FIG. 9 illustrates a procedure by which a UE performs V2X or SL communication based on a transmission mode in accordance with an embodiment of the present disclosure.

FIG. 10 illustrates three cast types according to an embodiment of the present disclosure.

FIG. 11 illustrates a resource unit for CBR measurement according to an embodiment of the present disclosure.

FIG. 12 illustrates an example of architecture in 5G system enabling the positioning for a UE connected to NG-RAN or E-UTRAN in accordance with an embodiment of the present disclosure.

FIG. 13 illustrates an implementation example of a network for measuring a location of a UE in accordance with an embodiment of the present disclosure.

FIG. 14 illustrates an example of a protocol layer used to support LPP message transmission between an LMF and a UE in accordance with an embodiment of the present disclosure.

FIG. 15 illustrates an example of a protocol layer used to support NRPPa PDU transmission between an LMF and a NG-RAN node in accordance with an embodiment of the present disclosure.

FIG. 16 illustrates an OTDOA positioning method according to an embodiment of the present disclosure.

FIG. 17 is a flow chart illustrating an operation method of a UE according to an embodiment of the present disclosure.

FIG. 18 is a flow chart illustrating an operation method of a UE according to an embodiment of the present disclosure.

FIG. 19 illustrates a communication system according to an embodiment of the present disclosure.

FIG. 20 illustrates a wireless device according to an embodiment of the present disclosure.

FIG. 21 illustrates a signal processing circuit for a transmission signal according to an embodiment of the present disclosure.

FIG. 22 illustrates a wireless device according to an embodiment of the present disclosure.

FIG. 23 illustrates a mobile device according to an embodiment of the present disclosure.

FIG. 24 illustrates a vehicle or an autonomous vehicle according to an embodiment of the present disclosure.

MODE FOR INVENTION

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

In the following description, 'when, if', or in case of may be replaced with 'based on'.

A technical feature described individually in one figure in the present disclosure may be individually implemented, or may be simultaneously implemented.

In the present disclosure, higher layer parameters may be parameters configured, pre-configured, or pre-defined for a UE. For example, a base station or a network may transmit the higher layer parameters to the UE. For example, the higher layer parameters may be transmitted via radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

For terms and techniques not specifically described among terms and techniques used in the present disclosure, reference may be made to a wireless communication standard document published before the present disclosure is filed. For example, the following document may be referred to.

TABLE 1

| 3GPP LTE | 3GPP NR (e.g., 5G) |
|---|---|
| 3GPP TS 36.211: Physical channels and modulation | 3GPP TS 38.211: Physical channels and modulation |
| 3GPP TS 36.212: Multiplexing and channel coding | 3GPP TS 38.212: Multiplexing and channel coding |
| 3GPP TS 36.213: Physical layer procedures | 3GPP TS 38.213: Physical layer procedures for control |
| 3GPP TS 36.214: Physical layer; Measurements | 3GPP TS 38.214: Physical layer procedures for data |
| 3GPP TS 36.300: Overall description | 3GPP TS 38.215: Physical layer measurements |
| 3GPP TS 36.304: User Equipment (UE) procedures in idle mode | 3GPP TS 38.300: Overall description |
| 3GPP TS 36.314: Layer 2 - Measurements | 3GPP TS 38.304: User Equipment (UE) procedures in idle mode and in RRC inactive state |
| 3GPP TS 36.321: Medium Access Control (MAC) protocol | 3GPP TS 38.321: Medium Access Control (MAC) protocol |
| 3GPP TS 36.322: Radio Link Control (RLC) protocol | 3GPP TS 38.322: Radio Link Control (RLC) protocol |
| 3GPP TS 36.323: Packet Data Convergence Protocol (PDCP) | 3GPP TS 38.323: Packet Data Convergence Protocol (PDCP) |
| 3GPP TS 36.331: Radio Resource Control (RRC) protocol | 3GPP TS 38.331: Radio Resource Control (RRC) protocol |
| | 3GPP TS 37.324: Service Data Adaptation Protocol (SDAP) |
| | 3GPP TS 37.340: Multi-connectivity; Overall description |

FIG. 1 illustrates a structure of an NR system according to an embodiment of the present disclosure.

An embodiment illustrated in FIG. 1 can be combined with various embodiments of the present disclosure.

Referring to FIG. 1, Next Generation-Radio Access Network (NG-RAN) may include a base station (BS) 20 that provides user plane and control plane protocol terminations to a user equipment (UE). For example, the base station 20 may include next generation-Node B (gNB) and/or evolved-NodeB (eNB).

For example, the UE 10 may be fixed or mobile and may be referred to as other terms such as a mobile station (MS), a user terminal (UT), a subscriber station (SS), a mobile terminal (MT), and a wireless device. For example, the base station 20 may be a fixed station which communicates with the UE 10 and may be referred to as other terms such as a base transceiver system (BTS) and an access point (AP).

FIG. 1 illustrates an example of including only the gNB, by way of example. The base stations 20 may be connected to each other via Xn interface. The base stations 20 may be connected to each other via 5G core network (5GC) and NG interface. More specifically, the base stations 20 may be connected to an access and mobility management function (AMF) 30 via NG-C interface and connected to user plane function (UPF) 30 via NG-U interface.

FIG. 2 illustrates a functional split between NG-RAN and 5GC according to a n embodiment of the present disclosure.

An embodiment illustrated in FIG. 2 can be combined with various embodiments of the present disclosure.

Referring to FIG. 2, the gNB may provide functions including inter-cell radio resource management (RRM), radio bearer (RB) control, connection mobility control, radio admission control, measurement configuration and provision, dynamic resource allocation, etc. The AMF may provide functions including non-access stratum (NAS) security, idle state mobility processing, etc. The UPF may provide functions including mobility anchoring, protocol data unit (PDU) processing, etc. The session management function (SMF) may provide functions including UE Internet protocol address allocation, PDU session control, etc.

Layers of a radio interface protocol between the UE and the network may be categorized into L1 (first layer), L2 (second layer), and L3 (third layer) based on three lower layers of an open system interconnection (OSI) reference model which is widely known in the communication system. Among them, a physical layer belonging to the first layer provides an information transfer service using a physical channel, and a radio resource control (RRC) layer located at the third layer serves to control a radio resource between the UE and the network. To this end, the RRC layer exchanges an RRC message between the UE and the BS.

FIG. 3 illustrates wireless protocol architecture according to an embodiment of the present disclosure.

An embodiment illustrated in FIG. 3 can be combined with various embodiments of the present disclosure.

Specifically, (a) of FIG. 3 illustrates radio protocol architecture for a user plane, and (b) of FIG. 3 illustrates radio protocol architecture for a control plane. The user plane is a protocol stack for transmitting user data, and the control plane is a protocol stack for transmitting a control signal.

Referring to FIG. 3, a physical (PHY) layer provides the information transfer service to a higher layer by using a physical channel. The PHY layer is connected to a medium access control (MAC) layer which is the upper layer via a transport channel. Data moves between the MAC layer and the PHY layer via the transport channel. The transport channel is classified based on how the data is transmitted via a radio interface and what feature the data is transmitted.

Data move between different PHY layers, i.e., between PHY layers of a transmitter and a receiver via the physical channel. The PHY channel may be modulated by an orthogonal frequency division multiplexing (OFDM) scheme and uses time and frequency as radio resources.

The MAC layer provides service to a radio link control (RLC) layer which is the higher layer via a logical channel. The MAC layer provides a mapping function from a plurality of logical channels to a plurality of transport channels. Further, the MAC layer provides a logical channel multiplexing function by mapping from the plurality of logical channels to a single transport channel. An MAC sub-layer provides the data transfer service on the logical channel.

An RLC layer performs concatenation, segmentation, and reassembly of an RLC service data unit (SDU). In order to guarantee various quality of services (QoS) required by a radio bearer (RB), the RLC layer provides three operating modes of a transparent mode (TM), an unacknowledged mode (UM), and an acknowledged mode (AM). The AM RLC provides error correction through an automatic repeat request (ARQ).

The radio resource control (RRC) layer is defined only in the control plane. The RRC layer serves to control the logical channels, the transport channels, and the physical channels in relation to configuration, re-configuration and release of the radio bearers. The RB means a logical path provided by the first layer (physical layer or PHY layer) and the second layer (MAC layer, RLC layer, or packet data convergence protocol (PDCP) layer) for data transmission and reception between the UE and the network.

The function of the PDCP layer in the user plane includes transmission and reception of the user data, header compression, and ciphering. The function of the PDCP layer in the control plane includes transmission and reception of control plane data and ciphering/integrity protection.

A service data adaptation protocol (SDAP) layer is defined only in the user plane. The SDAP layer performs mapping between QoS flow and data radio bearer, QoS flow ID marking in downlink and uplink packets, etc.

Configuring the RB means a process of defining characteristics of the radio protocol layer and channel to provide a specific service and configuring each specific parameter and operation method. The RB may be divided into a signaling radio bearer (SRB) and a data radio bearer (DRB) again. The SRB is used as a path for transmitting the RRC message in the control plane, and the DRB is used as a path for transmitting the user data in the user plane.

If an RRC connection is established between the RRC layer of the UE and the RRC layer of the BS, the UE is in an RRC_CONNECTED state and if not, the UE is in an RRC_IDLE state. In NR, an RRC_INACTIVE state has been additionally defined, and the UE in the RRC_INACTIVE state may maintain a connection with a core network, while may release a connection with the BS.

A downlink transport channel for transmitting data from the network to the UE includes a broadcast channel (BCH) for transmitting system information and a downlink shared channel (SCH) for transmitting other user traffic and control messages. The traffic or control message of downlink multicast or broadcast service may be transmitted via the downlink SCH or transmitted via a separate downlink multicast channel (MCH). An uplink transport channel for transmitting data from the UE to the network includes a random access channel (RACH) for transmitting an initial control message and an uplink shared channel (SCH) for transmitting other user traffic or control messages.

A logical channel which is above the transport channel and is mapped to the transport channel includes a broadcast control channel (BCCH), a paging control channel (PCCH), a common control channel (CCCH), a multicast control channel (MCCH), a multicast traffic channel (MTCH), etc.

The physical channel consists of several OFDM symbols in a time domain and several sub-carriers in a frequency domain. One sub-frame consists of a plurality of OFDM symbols in the time domain. A resource block consists of a plurality of OFDM symbols and a plurality of sub-carriers in units of resource allocation. In addition, each subframe may use specific sub-carriers of specific OFDM symbols (e.g., first OFDM symbol) of the corresponding subframe for a physical downlink control channel (PDCCH), i.e., L1/L2 control channel. A transmission time interval (TTI) is a unit time of subframe transmission.

FIG. 4 illustrates a structure of a radio frame of an NR, based on an embodiment of the present disclosure.

An embodiment of FIG. 4 can be combined with various embodiments of the present disclosure.

Referring to FIG. 2, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM (A) symbols based on a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot (Nslotsymb), a number slots per frame (Nframe,uslot), and a number of slots per subframe (Nsubframe,uslot) based on an SCS configuration (u), in a case where a normal CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 15 kHz (u = 0) | 14 | 10 | 1 |
| 30 kHz (u = 1) | 14 | 20 | 2 |
| 60 kHz (u = 2) | 14 | 40 | 4 |
| 120 kHz (u = 3) | 14 | 80 | 8 |
| 240 kHz (u = 4) | 14 | 160 | 16 |

Table 3 shows an example of a number of symbols per slot, a number of slots per frame, and a number of slots per subframe based on the SCS, in a case where an extended CP is used.

TABLE 3

| SCS ($15*2^u$) | $N^{slot}_{symb}$ | $N^{frame, u}_{slot}$ | $N^{subframe, u}_{slot}$ |
|---|---|---|---|
| 60 kHz (u = 2) | 12 | 40 | 4 |

In an NR system, OFDM (A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 4. Among the frequency ranges that are used in an NR system, FR1 may mean a “sub 6 GHz range”, and FR2 may mean an “above 6 GHz range” and may also be referred to as a millimeter wave (mmW).

TABLE 4

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHZ | 60, 120, 240 kHz |

For example, the base station may be a fixed point that communicates with the terminal 10, and may be referred to by other terms such as a base transceiver system (BTS), access point, etc.

As described above, the values of the frequency ranges in the NR system may be changed (or varied). For example, as shown below in Table 5, FR1 may include a band within a range of 410 MHz to 7125 MHz. More specifically, FR1 may include a frequency band of 6 GHz (or 5850, 5900, 5925 MHZ, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 5

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHZ | 60, 120, 240 kHz |

FIG. 3 illustrates a structure of a slot of an NR frame, based on an embodiment of the present disclosure.

An embodiment of FIG. 5 can be combined with various embodiments of the present disclosure.

Referring to FIG. 3, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

A radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

A bandwidth part (BWP) and a carrier are described below.

The BWP may be a contiguous set of physical resource blocks (PRBs) in a given numerology. The PRB may be selected from a contiguous subset of common resource blocks (CRB) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a location change of the bandwidth, or a change in subcarrier spacing of the bandwidth.

For example, the bandwidth may be decreased during a period in which activity is low to save power. For example, the location of the bandwidth may move in a frequency domain. For example, the location of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be referred to as a bandwidth part (BWP). The BA may be performed when the BS/network configures the BWP to the UE and the BS/network informs the UE of the BWP currently in an active state among the configured BWPs.

For example, the BWP may be at least one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

The BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-) configured in a carrier with respect to an out-of-coverage NR V2X UE and an RRC_IDLE UE. For the UE in the RRC_CONNECTED mode, at least one SL BWP may be activated in the carrier.

FIG. 6 illustrates a plurality of BWPs based on an embodiment of the present disclosure.

An embodiment of FIG. 6 can be combined with various embodiments of the present disclosure. In the embodiment of FIG. 6, it is assumed that there are three BWPs.

Referring to FIG. 9, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset NstartBWP from the point A, and a bandwidth NsizeBWP. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

V2X or SL communication is described below.

FIG. 7 illustrates wireless protocol architecture for SL communication according to an embodiment of the present disclosure.

An embodiment illustrated in FIG. 7 can be combined with various embodiments of the present disclosure. Specifically, (a) of FIG. 7 illustrates a user plane protocol stack, and (b) of FIG. 7 illustrates a control plane protocol stack.

A sidelink synchronization signal (SLSS) and synchronization information are described below.

The SLSS may include a primary sidelink synchronization signal (PSSS) and a secondary sidelink synchronization signal (SSSS), as a SL specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 Gold sequences may be used for the S-SSS. For example, the UE may detect an initial signal using the S-PSS and acquire a synchronization. For example, the UE may acquire a detailed synchronization using the S-PSS and the S-SSS and detect a synchronization signal ID.

A physical sidelink broadcast channel (PSBCH) may be a (broadcast) channel on which basic (system) information, that the UE should first know before transmitting/receiving the SL signal, is transmitted. For example, the basic information may be information related to the SLSS, a duplex mode (DM), a time division duplex uplink/downlink (TDD UL/DL) configuration, resource pool related information, a type of application related to the SLSS, a subframe offset, broadcast information, etc. For example, in order to evaluate a PSBCH capability, in NR V2X, a payload size of the PSBCH may be 56 bits including CRC of 24 bits.

The S-PSS, the S-SSS, and the PSBCH may be included in a block format (e.g., SL synchronization signal (SS)/PSBCH block, hereinafter, referred to as a sidelink-synchronization signal block (S-SSB)) which supports periodic transmission. The S-SSB may have the same numerology (i.e., SCS and CP lengths) as physical sidelink control channel (PSCCH)/physical sidelink shared channel (PSSCH) within a carrier, and a transmissions bandwidth may be within a (pre-) configured sidelink BWP. For example, a bandwidth of the S-SSB may be 11 resource blocks (RBs). For example, the PSBCH may be over 11 RBs. In addition, a frequency location of the S-SSB may be (pre) configured. Accordingly, the UE does not need to perform hypothesis detection in the frequency in order to discover the S-SSB in the carrier.

For example, based on Table 6, the UE may generate the S-SS/PSBCH block (i.e., S-SSB), and the UE may map the S-SS/PSBCH block on physical resource and transmit it.

TABLE 6

8.4.3.1 Time-frequency structure of an S-SS/PSBCH block

In the time domain, an *S-SS/PSBCH* block consists of $N_{symb}^{S-SSB}$ *OFDM* symbols, numbered in increasing order from 0 to $N_{symb}^{S-SSB}-1$ within the S-SS/PSBCH block, where S-PSS, S-SSS, and PSBCH with associated DM-RS are mapped to symbols as given by Table 8.4.3.1-1. The number of OFDM symbols in an S-SS/PSBCH block $N_{symb}^{S-SSB}=13$ for normal cyclic prefix and $N_{symb}^{S-SSB}=11$ for extended cyclic prefix. The first OFDM symbol in an S-SS/PSBCH block is the first OFDM symbol in the slot.

In the frequency domain, an S-SS/PSBCH block consists of 132 contiguous subcarriers with the subcarriers numbered in increasing order from 0 to 131 within the sidelink S-SS/PSBCH block. The quantities k and l represent the frequency and time indices, respectively, within one sidelink S-SS/PSBCH block.

For an S-SS/PSBCH block, the UE shall use
- antenna port 4000 for transmission of S-PSS, S-SSS, PSBCH and DM-RS for PSBCH;
- the same cyclic prefix length and subcarrier spacing for the S-PSS, S-SSS, PSBCH and DM-RS for PSBCH, Table 8.4.3.1-1: Resources within an S-SS/PSBCH block for S-PSS, S-SSS, PSBCH, and DM-RS.

| Channel or signal | OFDM symbol number l relative to the start of an S-SS/PSBCH block | Subcarrier number k relative to the start of an S-SS/PSBCH block |
|---|---|---|
| S-PSS | 1, 2 | 2, 3, . . . , 127, 128 |
| S-SSS | 3, 4 | 2, 3, . . . , 127, 128 |
| Set to zero | 1, 2, 3, 4 | 0, 1, 129, 130, 131 |

TABLE 6-continued

| | | |
|---|---|---|
| PSBCH | 0, 5, 6, … , $N_{symb}^{S-SSB}-1$ | 0, 1, . . . , 131 |
| DM-RS for PSBCH | 0, 5, 6, … , $N_{symb}^{S-SSB}-1$ | 0, 4, 8, . . . , 128 |

Synchronization acquisition of an SL UE is described below.

In time division multiple access (TDMA) and frequency division multiples access (FDMA) systems, accurate time and frequency synchronization is required. When the time and frequency synchronization is not accurately performed, system performance may deteriorate due to inter-symbol interference (ISI) and inter-carrier interference (ICI). This is also the same for V2X. In the V2X, for the time/frequency synchronization, an SL synchronization signal (SLSS) may be used in the physical layer, and master information block-sidelink-V2X (MIB-SL-V2X) may be used in a radio link control (RLC) layer.

FIG. 8 illustrates a synchronization source or a synchronization reference of V2X according to an embodiment of the present disclosure.

An embodiment illustrated in FIG. 8 can be combined with various embodiments of the present disclosure.

Referring to FIG. 8, in the V2X, the UE may be directly synchronized with global navigation satellite systems (GNSS) or indirectly synchronized with the GNSS through a UE (inside a network coverage or outside the network coverage) directly synchronized with the GNSS. If the GNSS is configured as a synchronization source, the UE may calculate a direct frame number (DFN) and a subframe number by using a coordinated universal time (UTC) and a (pre-) configured DFN offset.

Alternatively, the UE may be directly synchronized with a base station or synchronized with another UE which is time/frequency synchronized with the base station. For example, the base station may be eNB or gNB. For example, when the UE is inside the network coverage, the UE may receive synchronization information provided by the BS and may be directly synchronized with the BS. Thereafter, the UE may provide the synchronization information to another contiguous UE. When BS timing is configured as a synchronization reference, the UE may follow a cell associated with a corresponding frequency (when the UE is inside the cell coverage at the frequency), a primary cell or a serving cell (when the UE is outside the cell coverage at the frequency) for synchronization and downlink measurement.

The BS (e.g., serving cell) may provide a synchronization configuration for carriers used for the V2X or SL communication. In this case, the UE may follow the synchronization configuration received from the BS. If the UE does not detect any cell in the carriers used for the V2X or SL communication and does not receive the synchronization configuration from the serving cell, the UE may follow a pre-configured synchronization configuration.

Alternatively, the UE may be synchronized with another UE which does not acquire the synchronization information directly or indirectly from the BS or the GNSS. The synchronization source and a preference may be pre-configured to the UE. The synchronization source and the preference may be configured through a control message provided by the BS.

The SL synchronization source may be associated with a synchronization priority. For example, a relationship between the synchronization source and the synchronization priority may be defined as in Table 7 or Table 8. Table 7 or Table 8 is merely an example, and the synchronization source and the synchronization priority may be defined in various forms.

TABLE 7

| Priority level | GNSS-based synchronization | eNB/gNB-based synchronization |
|---|---|---|
| P0 | GNSS | eNB/gNB |
| P1 | All UEs directly synchronized with GNSS | All UEs directly synchronized with eNB/gNB |
| P2 | All UEs indirectly synchronized with GNSS | All UEs indirectly synchronized with eNB/gNB |
| P3 | All other UEs | GNSS |
| P4 | N/A | All UEs directly synchronized with GNSS |
| P5 | N/A | All UEs indirectly synchronized with GNSS |
| P6 | N/A | All other UEs |

TABLE 8

| Priority level | GNSS-based synchronization | eNB/gNB-based synchronization |
|---|---|---|
| P0 | GNSS | eNB/gNB |
| P1 | All UEs directly synchronized with GNSS | All UEs directly synchronized with eNB/gNB |
| P2 | All UEs indirectly synchronized with GNSS | All UEs indirectly synchronized with eNB/gNB |
| P3 | eNB/gNB | GNSS |
| P4 | All UEs directly synchronized with eNB/gNB | All UEs directly synchronized with GNSS |
| P5 | All UEs indirectly synchronized with eNB/gNB | All UEs indirectly synchronized with GNSS |
| P6 | Remaining UE(s) with low priority | Remaining UE(s) with low priority |

In Table 7 or Table 8, P0 may denote a highest priority, and P6 may denote a lowest priority. In Table 7 or Table 8, the BS may include at least one of the gNB or the eNB.

Whether to use the GNSS-based synchronization or the eNB/gNB-based synchronization may be (pre-) configured. In a single-carrier operation, the UE may derive a transmission timing of the UE from an available synchronization reference with the highest priority.

For example, the UE may (re) select a synchronization reference, and the UE may acquire a synchronization from the synchronization reference. And, the UE may perform the SL communication (e.g., PSCCH/PSSCH transmission/reception, physical sidelink feedback channel (PSFCH) transmission/reception, S-SSB transmission/reception, reference signal transmission/reception, etc.) based on the acquired synchronization.

FIG. 9 illustrates a procedure by which a UE performs V2X or SL communication based on a transmission mode in accordance with an embodiment of the present disclosure.

An embodiment illustrated in FIG. 9 can be combined with various embodiments of the present disclosure.

In various embodiments of the present disclosure, a transmission mode may be referred to as a mode or a resource allocation mode. Hereinafter, for convenience of description, a transmission in the LTE may be referred to as an LTE transmission mode, and a transmission mode in the NR may be referred to as an NR resource allocation mode.

For example, (a) of FIG. 9 illustrates a UE operation related to LTE transmission mode 1 or LTE transmission mode 3. Alternatively, for example, (a) of FIG. 9 illustrates a UE operation related to NR resource allocation mode 1. For example, the LTE transmission mode 1 may be applied to a general SL communication, and the LTE transmission mode 3 may be applied to the V2X communication.

For example, (b) of FIG. 9 illustrates a UE operation related to LTE transmission mode 2 or LTE transmission mode 4. Alternatively, for example, (b) of FIG. 9 illustrates a UE operation related to NR resource allocation mode 2.

Referring to (a) of FIG. 9, in the LTE transmission mode 1, the LTE transmission mode 3, or the NR resource allocation mode 1, the BS may schedule SL resources to be used by the UE for SL transmission. For example, in step S8000, the BS may transmit, to a first UE, information related to the SL resources and/or information related to UL resources. For example, the UL resources may include PUCCH resources and/or PUSCH resources. For example, the UL resource may be a resource for reporting a SL HARQ feedback to the BS.

For example, the first UE may receive information related to dynamic grant (DG) resources and/or information related to configured grant (CG) resources from the BS. For example, the CG resources may include CG type 1 resource or CG type 2 resource. In the present disclosure, the DG resource may be a resource configured/allocated to the first UE by the BS via downlink control information (DCI). In the present disclosure, the CG resource may be a (periodic) resource configured/allocated to the first UE by the BS via DCI and/or RRC message. For example, in case of the CG type 1 resource, the BS may transmit the RRC message including the information related to the CG resources to the first UE. For example, in case of the CG type 2 resource, the BS may transmit the RRC message including the information related to the CG resources to the first UE, and the BS may DCI related to activation or release of the CG resources to the first UE.

In step S8010, the first UE may transmit a PSCCH (e.g., sidelink control information (SCI) or first stage SCI) to a second UE based on the resource scheduling. In step S8020, the first UE may transmit a PSSCH (e.g., second stage SCI, MAC PDU, data, etc.) related to the PSCCH to the second UE. In step S8030, the first UE may receive a PSFCH related to the PSCCH/PSSCH from the second UE. For example, HARQ feedback information (e.g., NACK information or ACK information) may be received from the second UE via the PSFCH. In step S8040, the first UE may transmit/report the HARQ feedback information to the BS via PUCCH or PUSCH. For example, the HARQ feedback information reported to the BS may be information generated based on the HARQ feedback information received by the first UE from the second UE. For example, the HARQ feedback information reported to the BS may be information generated by the first UE based on a preconfigured rule. For example, the DCI may be DCI for scheduling of SL. For example, a format of the DCI may be DCI format 3_0 or DCI format 3_1. Table 9 shows an example of DCI for scheduling of SL.

TABLE 9

| 3GPP TS 38.212 |
|---|
| 7.3.1.4.1 Format 3_0 |
| DCI format 3_0 is used for scheduling of NR PSCCH and NR PSSCH in one cell. |
| The following information is transmitted by means of the DCI format 3_0 with CRC scrambled by SL-RNTI or SL-CS-RNTI: |
| Resource pool index -[log2 I] bits, where I is the number of resource pools for transmission configured by the higher layer parameter sl-TxPoolScheduling. |
| Time gap - 3 bits determined by higher layer parameter sl-DCI-ToSL-Trans, as defined in clause 8.1.2.1 of [6, TS 38.214] |
| HARQ process number - 4 bits as defined in clause 16.4 of [5, TS 38.213] |
| New data indicator - 1 bit as defined in clause 16.4 of [5, TS 38.213] |
| Lowest index of the subchannel allocation to the initial transmission - $\lceil \log_2(N^{SL}_{subChannel}) \rceil$ bits as defined in clause 8.1.2.2 of [6, TS 38.214] |
| SCI format 1-A fields according to clause 8.3.1.1: |
| Frequency resource assignment. |
| Time resource assignment. |
| PSFCH-to-HARQ feedback timing indicator - $\lceil \log_2 N_{fb\_timing} \rceil$ bits, where $N_{fb\_timing}$ is the number of entries in the higher layer parameter sl-PSFCH-ToPUCCH, as defined in clause 16.5 of [5, TS 38.213] |
| PUCCH resource indicator - 3 bits as defined in clause 16.5 of [5, TS 38.213]. |
| Configuration index - 0 bit if the UE is not configured to monitor DCI format 3_0 with CRC scrambled by SL-CS-RNTI; otherwise 3 bits as defined in clause 8.1.2 of [6, TS 38.214]. If the UE is configured to monitor DCI format 3_0 with CRC scrambled by SL-CS-RNTI, this field is reserved for DCI format 3_0 with CRC scrambled by SL-RNTI. |
| Counter sidelink assignment index - 2 bits |
| 2 bits as defined in clause 16.5.2 of [5, TS 38.213] if the UE is configured with pdsch-HARQ-ACK-Codebook = dynamic |
| 2 bits as defined in clause 16.5.1 of [5, TS 38.213] if the UE is configured with pdsch-HARQ-ACK-Codebook = semi-static |
| Padding bits, if required |
| 7.3.1.4.2 Format 3_1 |
| DCI format 3_1 is used for scheduling of LTE PSCCH and LTE PSSCH in one cell. |
| The following information is transmitted by means of the DCI format 3_1 with CRC scrambled by SL-L-CS-RNTI: |
| Timing offset - 3 bits determined by higher layer parameter sl-TimeOffsetEUTRA, as defined in clause 16.6 of [5, TS 38.213] |
| Carrier indicator -3 bits as defined in 5.3.3.1.9A of [11, TS 36.212]. |
| Lowest index of the subchannel allocation to the initial transmission - $\lceil \log_2(N^{SL}_{subchannel}) \rceil$ bits as defined in 5.3.3.1.9A of [11, TS 36.212]. |
| Frequency resource location of initial transmission and retransmission, as defined in 5.3.3.1.9A of [11, TS 36.212] |

TABLE 9-continued

| 3GPP TS 38.212 |
|---|
| Time gap between initial transmission and retransmission, as defined in 5.3.3.1.9A of [11, TS 36.212]<br>SL index - 2 bits as defined in 5.3.3.1.9A of [11, TS 36.212]<br>SL SPS configuration index - 3 bits as defined in clause 5.3.3.1.9A of [11, TS 36.212].<br>Activation/release indication - 1 bit as defined in clause 5.3.3.1.9A of [11, TS 36.212]. |

Referring to (b) of FIG. 9, in the LTE transmission mode 2, the LTE transmission mode 4, or the NR resource allocation mode 2, the UE may determine SL transmission resources within SL resources configured by the BS/network or within pre-configured SL resources. For example, the configured SL resources or the pre-configured SL resources may be a resource pool. For example, the UE may autonomously select or schedule resources for SL transmission. For example, the UE may self-select the resources within the configured resource pool to perform the SL communication. For example, the UE may perform a sensing and resource (re) selection procedure to self-select resources within a selection window. For example, the sensing may be performed on a per sub-channel basis. For example, in the step S8010, the first UE that self-selects the resources within the resource pool may transmit a PSCCH (e.g., sidelink control information (SCI) or first stage SCI) to the second UE using the resources. In the step S8020, the first UE may transmit a PSSCH (e.g., second stage SCI, MAC PDU, data, etc.) related to the PSCCH to the second UE. In the step S8030, the first UE may receive a PSFCH related to the PSCCH/PSSCH from the second UE.

Referring to (a) or (b) of FIG. 9, for example, the first UE may transmit the SCI to the second UE on the PSCCH. Alternatively, the first UE may transmit two contiguous SCIs (e.g., second stage SCIs) to the second UE on the PSCCH and/or the PSSCH. In this case, the second UE may decode the two contiguous SCIs (e.g., second stage SCIs) so as to receive the PSSCH from the first UE. In the present disclosure, the SCI transmitted on the PSCCH may be referred to as 1st SCI, first SCI, 1st stage SCI or 1st stage SCI format, and the SCI transmitted on the PSSCH may be referred to as 2nd SCI, second SCI, 2nd stage SCI, or 2nd stage SCI format. For example, the 1st stage SCI format may include SCI format 1-A, and the 2nd stage SCI format may include SCI format 2-A and/or SCI format 2-B. Table 10 shows an example of the 1 st stage SCI format.

TABLE 10

3GPP TS 38.212

8.3.1.1 SCI format 1-A

SCI format 1-A is used for the scheduling of PSSCH and $2^{nd}$-stage-SCI on PSSCH The following information is transmitted by means of the SCI format 1-A:

Priority - 3 bits as specified in clause 5.4.3.3 of [12, TS 23.287] and clause 5.22.1.3.1 of [8, TS 38.321].

Frequency resource assignment – $\left\lceil \log_2\left(\frac{N^{SL}_{subChannel}\left(N^{SL}_{subChannel}+1\right)}{2}\right)\right\rceil$ bits when the value of the higher layer parameter sl-MaxNumPerReserve is configured to 2; otherwise $\left\lceil \log_2\left(\frac{N^{SL}_{subChannel}\left(N^{SL}_{subChannel}+1\right)\left(2N^{SL}_{subChannel}+1\right)}{6}\right)\right\rceil$ bits when the value of the higher layer parameter sl-MaxNumPerReserve is configured to 3, as defined in clause 8.1.2.2 of [6, TS 38.214].

Time resource assignment - 5 bits when the value of the higher layer parameter sl-MaxNumPerReserve is configured to 2; otherwise 9 bits when the value of the higher layer parameter sl-MaxNumPerReserve is configured to 3, as defined in clause 8.1.2.1 of [6, TS 38.214].

Resource reservation period - $\lceil \log_2 N_{rsv\_period} \rceil$ bits as defined in clause 8.1.4 of [6, TS 38.214], where $N_{rsv\_period}$ is the number of entries in the higher layer parameter sl-ResourceReservePeriodList, if higher layer parameter sl-MultiReserveResource is configured; 0 bit otherwise.

DMRS pattern - $\lceil \log_2 N_{rsv\_period} \rceil$ bits as defined in clause 8.4.1.1.2 of [4, TS 38.211], where $N_{pattern}$ is the number of DMRS patterns configured by higher layer parameter sl-PSSCH-DMRS-TimePatternList.

$2^{nd}$-stage SCI format - 2 bits as defined in Table 8.3.1.1-1.

Beta_offset indicator - 2 bits as provided by higher layer parameter sl-BetaOffsets2ndSCI and Table 8.3.1.1-2.

Number of DMRS port - 1 bit as defined in Table 8.3.1.1-3.

Modulation and coding scheme - 5 bits as defined in clause 8.1.3 of [6, TS 38.214].

Additional MCS table indicator - as defined in clause 8.1.3.1 of [6, TS 38.214]: 1 bit if one MCS table is configured by higher layer parameter sl-Additional-MCS-Table; 2 bits if two MCS tables are configured by higher layer parameter sl- Additional-MCS-Table; 0 bit otherwise.

PSFCH overhead indication - 1 bit as defined clause 8.1.3.2 of [6, TS 38.214] if higher layer parameter sl-PSFCH-Period = 2 or 4; 0 bit otherwise.

Reserved - a number of bits as determined by higher layer parameter sl-NumReservedBits, with value set to zero.

Table 8.3.1.1-1: $2^{nd}$-stage SCI formats

| Value of 2nd-stage SCI format field | 2nd-stage SCI format |
|---|---|
| 00 | SCI format 2-A |
| 01 | SCI format 2-B |
| 10 | Reserved |

TABLE 10-continued

| | |
|---|---|
| 11 | Reserved |

Table 8.3.1.1-2: Mapping of Beta_offset indicator values to indexes in Table 9.3-2 of [5, TS38.213]

| Value of Beta_offset indicator | Beta_offset index in Table 9.3-2 of [5, TS38.213] |
|---|---|
| 00 | 1st index provided by higher layer parameter sl-BetaOffsets2ndSCI |
| 01 | 2nd index provided by higher layer parameter sl-BetaOffsets2ndSCI |
| 10 | 3rd index provided by higher layer parameter sl-BetaOffsets2ndSCI |
| 11 | 4th index provided by higher layer parameter sl-BetaOffsets2ndSCI |

Table 8.3.1.1-3: Number of DMRS port(s)

| Value of the Number of DMRS port field | Antenna ports |
|---|---|
| 0 | 1000 |
| 1 | 1000 and 1001 |

Table 11 shows an example of the 2nd stage SCI format.

TABLE 11

3GPP TS 38.212

8.4.1.1 SCI format 2-A

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

- HARQ process number - 4 bits as defined in clause 16.4 of [5, TS 38.213].
- New data indicator - 1 bit as defined in clause 16.4 of [5, TS 38.213].
- Redundancy version - 2 bits as defined in clause 16.4 of [6, TS 38.214].
- Source ID - 8 bits as defined in clause 8.1 of [6, TS 38.214].
- Destination ID - 16 bits as defined in clause 8.1 of [6, TS 38.214].
- HARQ feedback enabled/disabled indicator - 1 bit as defined in clause 16.3 of [5, TS 38.213].
- Cast type indicator - 2 bits as defined in Table 8.4.1.1-1.
- CSI request - 1 bit as defined in clause 8.2.1 of [6, TS 38.214].

Table 8.4.1.1-1: Cast type indicator

| Value of Cast type indicator | Cast type |
|---|---|
| 00 | Broadcast |
| 01 | Groupcast when HARQ-ACK information includes ACK or NACK |
| 10 | Unicast |
| 11 | Groupcast when HARQ-ACK information includes only NACK |

8.4.1.2 SCI format 2-B

SCI format 2-B is used for the decoding of PSSCH, with HARQ operation when HARQ-ACK information includes only NACK, or when there is no feedback of HARQ-ACK information.

The following information is transmitted by means of the SCI format 2-B:

- HARQ process number - 4 bits as defined in clause 16.4 of [5, TS 38.213].
- New data indicator - 1 bit as defined in clause 16.4 of [5, TS 38.213].
- Redundancy version - 2 bits as defined in clause 16.4 of [6, TS 38.214].
- Source ID - 8 bits as defined in clause 8.1 of [6, TS 38.214].
- Destination ID - 16 bits as defined in clause 8.1 of [6, TS 38.214].
- HARQ feedback enabled/disabled indicator - 1 bit as defined in clause 16.3 of [5, TS 38.213].
- Zone ID - 12 bits as defined in clause 5.8.11 of [9, TS 38.331].
- Communication range requirement - 4 bits determined by higher layer parameter sl-ZoneConfigMCR-Index.

Referring to (a) or (b) of FIG. 9, in step S8030, the first UE may receive the PSFCH based on Table 12. For example, the first UE and the second UE may determine PSFCH resources based on Table 12, and the second UE may transmit HARQ feedback to the first UE using the PSFCH resources.

TABLE 12

| 3GPP TS 38.213 |
|---|
| 16.3 UE procedure for reporting HARQ-ACK on sidelink<br>A UE can be indicated by an SCI format scheduling a PSSCH reception, in one or more sub-channels from a number of $N_{subch}^{PSSCH}$ sub-channels, to transmit a PSFCH with HARQ-ACK information in response to the PSSCH reception. The UE provides HARQ-ACK information that includes ACK or NACK, or only NACK.<br>A UE can be provided, by sl-PSFCH-Period-r16, a number of slots in a resource pool for a period of PSFCH transmission occasion resources. If the number is zero, PSFCH transmissions from the UE in the resource pool are disabled.<br>A UE expects that a slot $t_k^{\prime SL}$ $(0 \le k < T'_{max})$ has a $PSFCH$ transmission occasion resource if $k \bmod N_{PSSCH}^{PSFCH} = 0$, where $t_k^{\prime SL}$ is defined in [6, TS 38.214], and $T'_{max}$ is number of slots that belong to the resource pool within 10240 msec according to [6, $TS$ 38.214], and $N_{PSSCH}^{PSFCH}$ is provided by sl-PSFCH-Period-r16.<br>A UE may be indicated by higher layers to not transmit a PSFCH in response to a PSSCH reception [11, TS 38.321].<br>If a UE receives a PSSCH in a resource pool and the HARQ feedback enabled/disabled indicator field in an associated SCI format 2-A or a SCI format 2-B has value 1 [5, TS 38.212], the UE provides the HARQ-ACK information in a PSFCH transmission in the resource pool. The UE transmits the PSFCH in a first slot that includes PSFCH resources and is at least a number of slots, provided by sl-MinTimeGapPSFCH-r16, of the resource pool after a last slot of the PSSCH reception.<br>A UE is provided by sl-PSRCH-RB-Set-r16 a set of $M_{PRB,set}^{PSFCH}$ PRBs in resource pool for PSFCH transmission in a PRB of the resource pool. For a number of $N_{subch}$ sub-channels for the resource pool, provided by sl-NumSubchannel, and a number of PSSCH slots associated with a PSFCH slot that is less than or equal to $N_{PSSCH}^{PSFCH}$, the UE allocates the $\left[\left(i + j \cdot N_{PSSCH}^{PSFCH}\right) \cdot M_{subch,slot}^{PSFCH}, \left(i + 1 + j \cdot N_{PSSCH}^{PSFCH}\right) \cdot M_{subch,slot}^{PSFCH} - 1\right]$ PRBs from the $M_{PRB,set}^{PSFCH}$ PRBs to slot $i$ among the PSSCH slots associated with the PSFCH slot and sub-channel $j$, where $M_{subch,slot}^{PSFCH} = M_{PRB,set}^{PSFCH} / \left(N_{subch} \cdot N_{PSSCH}^{PSFCH}\right)$, $0 \le i < N_{PSSCH}^{PSFCH}$, $0 \le j < N_{subch}$, and the allocation starts in an ascending order of $i$ and continues in an ascending order of $j$. The UE expects that $M_{PRB,set}^{PSFCH}$ is a multiple of $N_{subch} \cdot N_{PSSCH}^{PSFCH}$.<br>A UE determines a number of PSFCH resources available for multiplexing HARQ-ACK information in a PSFCH transmission as $R_{PRB,CS}^{PSFCH} = N_{type}^{PSFCH} \cdot M_{subch,slot}^{PSFCH} \cdot N_{CS}^{PSFCH}$ where $N_{CS}^{PSFCH}$ is a number of cyclic shift pairs for the resource pool and, based on an indication by higher layers,<br>$N_{type}^{PSFCH} = 1$ and the $M_{subch,slot}^{PSFCH}$ PRBs are associated with the starting sub-channel of the corresponding PSSCH<br>$N_{type}^{PSFCH} = N_{subch}^{PSSCH}$ and the $N_{subch}^{PSSCH} \cdot M_{subch,slot}^{PSFCH}$ PRBs are associated with one or more sub-channels from the $N_{subch}^{PSSCH}$ sub-channels of the corresponding $PSSCH$ |

TABLE 12-continued

| 3GPP TS 38.213 |
|---|

The PSFCH resources are first indexed according to an ascending order of the PRB index, from the $N_{type}^{PSFCH} \cdot M_{subch,slot}^{PSFCH}$ PRBs, and then according to an ascending order of the cyclic shift pair index from the $N_{CS}^{PSFCH}$ cyclic shift pairs.

A UE determines an index of a PSFCH resource for a PSFCH transmission in response to a PSSCH reception as $(P_{ID} + M_{ID}) \bmod R_{PRB,CS}^{PSFCH}$ where $P_{ID}$ is a physical layer source ID provided by SCI format 2-A or 2-B [5, TS 38.212] scheduling the PSSCH reception, and $M_{ID}$ is the identity of the UE receiving the PSSCH as indicated by higher layers if the UE detects a SCI format 2-A with Cast type indicator field value of "01"; otherwise, $M_{ID}$ is zero.

A UE determines a $m_0$ value, for computing a value of cyclic shift α [4, TS 38.211], from a cyclic shift pair index corresponding to a PSFCH resource index and from $N_{CS}^{PSFCH}$ using Table 16.3-1.

Table 16.3-1: Set of cyclic shift pairs

| | $m_0$ | | | | | |
|---|---|---|---|---|---|---|
| $N_{CS}^{PSFCH}$ | Cyclic Shift Pair Index 0 | Cyclic Shift Pair Index 1 | Cyclic Shift Pair Index 2 | Cyclic Shift Pair Index 3 | Cyclic Shift Pair Index 4 | Cyclic Shift Pair Index 5 |
| 1 | 0 | — | — | — | — | — |
| 2 | 0 | 3 | — | — | — | — |
| 3 | 0 | 2 | 4 | — | — | — |
| 6 | 0 | 1 | 2 | 3 | 4 | 5 |

A UE determines a $m_{cs}$ value, for computing a value of cyclic shift α [4, TS 38.211], as in Table 16.3-2 if the UE detects a SCI format 2-A with Cast type indicator field value of "01" or "10", or as in Table 16.3-3 if the UE detects a SCI format 2-B or a SCI format 2-A with Cast type indicator field value of "11". The UE applies one cyclic shift from a cyclic shift pair to a sequence used for the PSFCH transmission [4, TS 38.211].

Table 16.3-2: Mapping of HARQ-ACK information bit values to a cyclic shift, from a cyclic shift pair, of a sequence for a PSFCH transmission when HARQ-ACK information includes ACK or NACK

| HARQ-ACK Value | 0 (NACK) | 1 (ACK) |
|---|---|---|
| Sequence cyclic shift | 0 | 6 |

Table 16.3-3: Mapping of HARQ-ACK information bit values to a cyclic shift, from a cyclic shift pair, of a sequence for a PSFCH transmission when HARQ-ACK information includes only NACK

| HARQ-ACK Value | 0 (NACK) | 1 (ACK) |
|---|---|---|
| Sequence cyclic shift | 0 | N/A |

Referring to (a) of FIG. 9, in step S8040, the first UE may transmit SL HARQ feedback to the base station via the PUCCH and/or the PUSCH based on Table 13.

TABLE 13

| 3GPP TS 38.213 |
|---|

16.5 UE procedure for reporting HARQ-ACK on uplink

A UE can be provided PUCCH resources or PUSCH resources [12, TS 38.331] to report HARQ-ACK information that the UE generates based on HARQ-ACK information that the UE obtains from PSFCH receptions, or from absence of PSFCH receptions. The UE reports HARQ-ACK information on the primary cell of the PUCCH group, as described in Clause 9, of the cell where the UE monitors PDCCH for detection of DCI format 3_0.

TABLE 13-continued

| 3GPP TS 38.213 |
| --- |

For SL configured grant Type 1 or Type 2 PSSCH transmissions by a UE within a time period provided by sl-PeriodCG, the UE generates one HARQ-ACK information bit in response to the PSFCH receptions to multiplex in a PUCCH transmission occasion that is after a last time resource, in a set of time resources.

For PSSCH transmissions scheduled by a DCI format 3_0, a UE generates HARQ-ACK information in response to PSFCH receptions to multiplex in a PUCCH transmission occasion that is after a last time resource in a set of time resources provided by the DCI format 3_0.

For each PSFCH reception occasion, from a number of PSFCH reception occasions, the UE generates HARQ-ACK information to report in a PUCCH or PUSCH transmission. The UE can be indicated by a SCI format to perform one of the following and the UE constructs a HARQ-ACK codeword with HARQ-ACK information, when applicable

- if the UE receives a PSFCH associated with a SCI format 2-A with Cast type indicator field value of "10"
  - generate HARQ-ACK information with same value as a value of HARQ-ACK information the UE determines from a PSFCH reception in the PSFCH reception occasion and, if the UE determines that a PSFCH is not received at the PSFCH reception occasion, generate NACK
- if the UE receives a PSFCH associated with a SCI format 2-A with Cast type indicator field value of "01"
  - generate ACK if the UE determines ACK from at least one PSFCH reception occasion, from the number of PSFCH reception occasions, in PSFCH resources corresponding to every identity $M_{ID}$ of the UEs that the UE expects to receive the PSSCH, as described in Clause 16.3; otherwise, generate NACK
- if the UE receives a PSFCH associated with a SCI format 2-B or a SCI format 2-A with Cast type indicator field value of "11"
  - generate ACK when the UE determines absence of PSFCH reception for each PSFCH reception occasion from the number of PSFCH reception occasions; otherwise, generate NACK After a UE transmits PSSCHs and receives PSFCHs in corresponding PSFCH resource occasions, the priority value of HARQ-ACK information is same as the priority value of the PSSCH transmissions that is associated with the PSFCH reception occasions providing the HARQ-ACK information.

The UE generates a NACK when, due to prioritization, as described in Clause 16.2.4, the UE does not receive PSFCH in any PSFCH reception occasion associated with a PSSCH transmission in a resource provided by a DCI format 3_0 with CRC scrambled by a SL-RNTI or, for a configured grant, in a resource provided in a single period and for which the UE is provided a PUCCH resource to report HARQ-ACK information. The priority value of the NACK is same as the priority value of the PSSCH transmission.

The UE generates a NACK when, due to prioritization as described in Clause 16.2.4, the UE does not transmit a PSSCH in any of the resources provided by a DCI format 3_0 with CRC scrambled by SL-RNTI or, for a configured grant, in any of the resources provided in a single period and for which the UE is provided a PUCCH resource to report HARQ-ACK information. The priority value of the NACK is same as the priority value of the PSSCH that was not transmitted due to prioritization.

The UE generates an ACK if the UE does not transmit a PSCCH with a SCI format 1-A scheduling a PSSCH in any of the resources provided by a configured grant in a single period and for which the UE is provided a PUCCH resource to report HARQ-ACK information. The priority value of the ACK is same as the largest priority value among the possible priority values for the configured grant.

A UE does not expect to be provided PUCCH resources or PUSCH resources to report HARQ-ACK information that start earlier than $(N + 1) \cdot (2048 + 144) \cdot \kappa \cdot 2^{\mu} \cdot T_c$ after the end of a last symbol of a last PSFCH reception occasion, from a number of PSFCH reception occasions that the UE generates HARQ-ACK information to report in a PUCCH or PUSCH transmission, where

- $\kappa$ and $T_c$ are defined in [4, TS 38.211]
- $\mu = \min(\mu_{SL}, \mu_{UL})$, where $\mu_{SL}$ is the SCS configuration of the SL BWP and $\mu_{UL}$ is the SCS configuration of the active UL BWP on the primary cell
- N is determined from $\mu$ according to Table 16.5-1

Table 16.5-1: Values of N

| $\mu$ | N |
| --- | --- |
| 0 | 14 |
| 1 | 18 |
| 2 | 28 |
| 3 | 32 |

With reference to slots for PUCCH transmissions and for a number of PSFCH reception occasions ending in slot n, the UE provides the generated HARQ-ACK information in a PUCCH transmission within slot n + k, subject to the overlapping conditions in Clause 9.2.5, where k is a number of slots indicated by a PSFCH-to-HARQ_feedback timing indicator field, if present, in a DCI format indicating a slot for PUCCH transmission to report the HARQ-ACK information, or k is provided by sl-PSFCH-ToPUCCH-CG-Type1-r16. k = 0 corresponds to a last slot for a PUCCH transmission that would overlap with the last PSFCH reception occasion assuming that the start of the sidelink frame is same as the start of the downlink frame [4, TS 38.211].

For a PSSCH transmission by a UE that is scheduled by a DCI format, or for a SL configured grant Type 2 PSSCH transmission activated by a DCI format, the DCI format indicates to the UE that a PUCCH resource is not provided when a value of the PUCCH resource indicator field is zero and a value of PSFCH-to-HARQ feedback timing indicator field, if present, is zero. For a SL configured TABLE 13-continued

| 3GPP TS 38.213 |
| --- |
| grant Type 1 PSSCH transmission, a PUCCH resource can be provided by sl-N1PUCCH-AN-r16 and sl-PSFCH-ToPUCCH-CG-Type1-r16. If a PUCCH resource is not provided, the UE does not transmit a PUCCH with generated HARQ-ACK information from PSFCH reception occasions. For a PUCCH transmission with HARQ-ACK information, a UE determines a PUCCH resource after determining a set of PUCCH resources for $O_{UCI}$ HARQ-ACK information bits, as described in Clause 9.2.1. The PUCCH resource determination is based on a PUCCH resource indicator field [5, TS 38.212] in a last DCI format 3_0, among the DCI formats 3_0 that have a value of a PSFCH-to-HARQ_feedback timing indicator field indicating a same slot for the PUCCH transmission, that the UE detects and for which the UE transmits corresponding HARQ-ACK information in the PUCCH where, for PUCCH resource determination, detected DCI formats are indexed in an ascending order across PDCCH monitoring occasion indexes. A UE does not expect to multiplex HARQ-ACK information for more than one SL configured grants in a same PUCCH. A priority value of a PUCCH transmission with one or more sidelink HARQ-ACK information bits is the smallest priority value for the one or more HARQ-ACK information bits. In the following, the CRC for DCI format 3_0 is scrambled with a SL-RNTI or a SL-CS-RNTI. |

FIG. 10 illustrates three cast types according to an embodiment of the present disclosure.

An embodiment of FIG. 10 can be combined with various embodiments of the present disclosure.

Specifically, (a) of FIG. 10 illustrates a broadcast type SL communication, (b) of FIG. 10 illustrates a unicast type SL communication, and (c) of FIG. 10 illustrates a groupcast type SL communication. In the unicast type SL communication, the UE may perform one-to-one communication with another UE. In the groupcast type SL communication, the UE may perform the SL communication with one or more UEs in a group to which the UE belongs. In various embodiments of the present disclosure, the SL groupcast communication may be replaced by SL multicast communication, SL one-to-many communication, etc.

A hybrid automatic repeat request (HARQ) procedure is described.

For example, SL HARQ feedback may be enabled for the unicast. In this case, in a non-code block group (CBG) operation, if a receiving UE decodes a PSCCH targeting the receiving UE and successfully decodes a transport block related to the PSCCH, the receiving UE may generate HARQ-ACK. And, the receiving UE may transmit the HARQ-ACK to a transmitting UE. On the other hand, if the receiving UE decodes the PSCCH targeting the receiving UE and then does not successfully decode the transport block related to the PSCCH, the receiving UE may generate HARQ-NACK. And, the receiving UE may transmit the HARQ-NACK to the transmitting UE.

For example, the SL HARQ feedback may be enabled for the groupcast. For example, in the non-CBG operation, two HARQ feedback options may be supported for the groupcast.

(1) Groupcast option 1: If the receiving UE decodes the PSCCH targeting the receiving UE and then fails to decode the transport block related to the PSCCH, the receiving UE may transmit the HARQ-NACK to the transmitting UE via a PSFCH. On the other hand, if the receiving UE decodes the PSCCH targeting the receiving UE and successfully decodes the transport block related to the PSCCH, the receiving UE may not transmit the HARQ-ACK to the transmitting UE.

(2) Groupcast option 2: If the receiving UE decodes the PSCCH targeting the receiving UE and then fails to decode the transport block related to the PSCCH, the receiving UE may transmit the HARQ-NACK to the transmitting UE via the PSFCH. And, if the receiving UE decodes the PSCCH targeting the receiving UE and successfully decodes the transport block related to the PSCCH, the receiving UE may transmit the HARQ-ACK to the transmitting UE via the PSFCH.

For example, if the groupcast option 1 is used for the SL HARQ feedback, all the UEs performing the groupcast communication may share PSFCH resources. For example, UEs belonging to the same group may transmit the HARQ feedback using the same PSFCH resources.

For example, when the groupcast option 2 is used for the SL HARQ feedback, the respective UEs performing the groupcast communication may use different PSFCH resources for the transmission of the HARQ feedback. For example, UEs belonging to the same group may transmit the HARQ feedback using the different PSFCH resources.

In the present disclosure, the HARQ-ACK may be referred to as ACK, ACK information, or positive-ACK information, and the HARQ-NACK may be referred to as NACK, NACK information, or negative-ACK information.

SL measurement and reporting are described below.

SL measurement and reporting (e.g., RSRP, RSRQ) between UEs may be considered in SL for purpose of QoS prediction, initial transmission parameter setting, link adaptation, link management, admission control, etc. For example, the receiving UE may receive a reference signal from the transmitting UE, and the receiving UE may measure a channel state for the transmitting UE based on the reference signal. In addition, the receiving UE may report channel state information (CSI) to the transmitting UE. SL related measurement and reporting may include measurement and reporting of the CBR, and reporting of location information. Examples of channel state information (CSI) for V2X may include channel quality indicator (CQI), precoding matrix index (PMI), rank indicator (RI), reference signal received power (RSRP), reference signal received quality (RSRQ), pathgain/pathloss, SRI (sounding reference symbols (SRS) resource indicator), CSI-RS resource indicator (CRI), interference condition, vehicle motion, etc. The CSI reporting may be activated and inactivated based on configuration.

For example, the transmitting UE may transmit the CSI-RS to the receiving UE, and the receiving UE may measure the CQI or the RI using the CSI-RS. For example, the CSI-RS may be referred to as SL-CSI-RS. For example, the CSI-RS may be confined within PSSCH transmission. For example, the transmitting UE may transmit the CSI-RS to the receiving UE by including the CSI-RS on the PSSCH resource.

Sidelink congestion control is described below.

For example, the UE may decide whether energy measured in a unit time/frequency resource is at a predetermined level or more, and adjust an amount and a frequency of its transmission resources based on a ratio of the unit time/frequency resource in which the energy of the predetermined level is observed. In the present disclosure, a ratio of time/frequency resources in which the energy of the predetermined level is observed may be defined as a channel busy ratio (CBR). The UE may measure a CBR for the channel/frequency. Additionally, the UE may transmit the measured CBR to the network/BS.

FIG. 11 illustrates a resource unit for CBR measurement according to an embodiment of the present disclosure.

An embodiment of FIG. 11 can be combined with various embodiments of the present disclosure.

Referring to FIG. 11, a CBR may mean the number of sub-channels in which a measurement result value of a received signal strength indicator (RSSI) has a value equal to or greater than a preset threshold as a result of measuring, by a UE, the RSSI on a per sub-channel basis during a specific duration (e.g., 100 ms). Alternatively, the CBR may mean a ratio of sub-channels having the value equal to or greater than the preset threshold among sub-channels during the specific duration. For example, in the embodiment of FIG. 11, when it is assumed that hatched subchannels are the sub-channels having the value equal to or greater than the preset threshold, the CBR may mean a ratio of the hatched sub-channels during a duration of 100 ms. Additionally, the UE may report the CBR to a base station.

For example, if PSCCH and PSSCH are multiplexed in a frequency domain, the UE may perform one CBR measurement for one resource pool. If a PSFCH resource is configured or pre-configured, the PSFCH resource may be excluded from the CBR measurement.

Furthermore, congestion control considering a priority of traffic (e.g., packet) may be required. To this end, for example, the UE may measure a channel occupancy ratio (CR). Specifically, the UE may measure the CBR, and the UE may determine a maximum value CRlimitk of a channel occupancy ratio CRk which can be occupied by traffic corresponding to each priority (e.g., k) based on the CBR. For example, the UE may derive the maximum value CRlimitk of the channel occupancy ratio for the priority of each traffic based on a CBR measurement value and a predetermined table. For example, in the case of traffic with a relatively high priority, the UE may derive a maximum value of a relatively high channel occupancy ratio. Thereafter, the UE may perform the congestion control by restricting a total sum of channel occupancy ratios of traffics, in which the priority k of the traffic is lower than "i", to a predetermined value or less. According to this method, a stronger channel occupancy ratio restriction may be given to traffics with a relatively low priority.

Besides, the UE may perform the SL congestion control by using a method such as magnitude adjustment of transmission power, drop of a packet, determination whether retransmission is performed, transport RB size adjustment (MCS adjustment), etc.

Table 14 shows an example of SL CBR and SL RSSI.

TABLE 14

| | |
|---|---|
| | SL CBR |
| Definition | SL Channel Busy Ratio (SL CBR) measured in slot n is defined as the portion of sub-channels in the resource pool whose SL RSSI measured by the UE exceed a (pre-)configured threshold sensed over a CBR measurement window [n − a, n − 1], wherein a is equal to 100 or 100-20 slots, according to higher layer parameter timeWindowSize-CBR. |
| Applicable for | RRC_IDLE intra-frequency,<br>RRC_IDLE inter-frequency,<br>RRC_CONNECTED intra-frequency,<br>RRC_CONNECTED inter-frequency |
| | SL RSSI |
| Definition | Sidelink Received Signal Strength Indicator (SL RSSI) is defined as the linear average of the total received power (in [W]) observed in the configured sub-channel in OFDM symbols of a slot configured for PSCCH and PSSCH, starting from the $2^{nd}$ OFDM symbol.<br>For frequency range 1, the reference point for the SL RSSI shall be the antenna connector of the UE. For frequency range 2, SL RSSI shall be measured based on the combined signal from antenna elements corresponding to a given receiver branch. For frequency range 1 and 2, if receiver diversity is in use by the UE, the reported SL RSSI value shall not be lower than the corresponding SL RSSI of any of the individual receiver branches. |
| Applicable for | RRC_IDLE intra-frequency,<br>RRC_IDLE inter-frequency,<br>RRC_CONNECTED intra-frequency.<br>RRC_CONNECTED inter-frequency |

Referring to FIG. 14, a slot index may be based on a physical slot index.

Table 15 shows an example of SL channel occupancy ratio (CR).

TABLE 15

| | |
|---|---|
| Definition | Sidelink Channel Occupancy Ratio (SL CR) evaluated at slot n is defined as the total number of sub-channels used for its transmissions in slots [n − a, n − 1] and granted in slots [n, n + b] divided by the total number of configured sub-channels in the transmission pool over [n − a, n + b]. |
| Applicable for | RRC_IDLE intra-frequency.<br>RRC_IDLE Inter-frequency,<br>RRC_CONNECTED intra-frequency.<br>RRC_CONNECTED inter-frequency |

NOTE 1:
a is a positive integer and b is 0 or a positive integer; a and b are determined by UE implementation with a + b + 1 = 1000 or 1000 · $2^{\mu}$ slots, according to higher layer parameter timeWindowSize-CR, b < (a + b + 1)/2, and n + b shall not exceed the last transmission opportunity of the grant for the current transmission.
NOTE 2:
SL CR is evaluated for each (re)transmission.
NOTE 3:
In evaluating SL CR, the UE shall assume the transmission parameter used at slot n is reused according to the existing grant(s) in slot [n + 1, n + b] without packet dropping.
NOTE 4:
The slot index is based on physical slot index.
NOTE 5:
SL CR can be computed per priority level
NOTE 6:
A resource is considered granted if it is a member of a selected sidelink grant as defined in TS 38.321 [7].

Positioning is described below.

FIG. 12 illustrates an example of architecture in 5G system enabling the positioning for a UE connected to NG-RAN or E-UTRAN in accordance with an embodiment of the present disclosure.

Referring to FIG. 12, an AMF may receive a request for a location service related to a specific target UE from another entity such as a gateway mobile location center (GMLC), or the AMF itself may determine to start the location service on behalf of the specific target UE. Then, the AMF may transmit a location service request to a location management function (LMF). The LMF receiving the location service request may process the location service request and return a processing result including an estimated location of the UE to the AMF. If the location service request is received from another entity, such as the GMLC, other than the AMF, the AMF may transmit the processing result received from the LMF to another entity.

New generation evolved-NB (ng-eNB) and gNB are network elements which can provide a measurement result for location estimation, and may measure a radio signal for the target UE and transfer a result value to the LMF. Further, the ng-eNB may control some transmission points (TPs), such as remote radio heads, or PRS dedicated TPs that support a positioning reference signal (PRS) based beacon system for E-UTRAN.

The LMF may be connected to an enhanced serving mobile location centre (E-SMLC), and the E-SMLC may allow the LMF to be connected to the E-UTRAN. For example, the E-SMLC may allow the LMF to support an observed time difference of arrival (OTDOA) which is one of positioning methods of the E-UTRAN by using downlink measurement which the target UE acquires through signals transmitted from PRS dedicated TPs in the eNB and/or the E-UTRAN.

The LMF may be connected to an SUPL location platform (SLP). The LMF may support and manage different positioning services for the target UEs. The LMF may interact with serving ng-eNB or serving gNB for the target UE, in order to acquire the location measurement of the UE. For the positioning of the target UE, the LMF may determine a positioning method based on a location service (LCS) client type, a required quality of service (QoS), UE positioning capabilities, gNB positioning capabilities, and ng-eNB positioning capabilities, and apply the positioning method to the serving gNB and/or the serving ng-eNB. In addition, the LMF may determine a location estimation value for the target UE, and additional information such as accuracy of the location estimation and speed. The SLP is a secure user plane location (SUPL) entity that takes charge of positioning through the user plane.

The UE may measure a downlink signal through the NG-RAN and the E-UTRAN, and a source such as different global navigation satellite system (GNSS), terrestrial beacon system (TBS), wireless local access network (WLAN) access point, Bluetooth beacon, and a UE air pressure sensor. The UE may include an LCS application, and access the LCS application through communication with the network accessed by the UE or another application included in the UE. The LCS application may include a measurement and calculation function required for determining the location of the UE. For example, the UE may include an independent positioning function, such as a global positioning system (GPS), and report the location of the UE independently from NG-RAN transmission. The independently acquired positioning information may also be used as assistance information of positioning information acquired from the network.

FIG. 13 illustrates an implementation example of a network for measuring a location of a UE in accordance with an embodiment of the present disclosure.

When a UE is in a connection management-IDLE (CM-IDLE) state, if the AMF receives a location service request, the AMF may establish signaling connection with the UE and request a network trigger service in order to allocate a specific serving gNB or ng-eNB. This operation process is omitted in FIG. 13. That is, in FIG. 13, it may be assumed that the UE is in a connected mode. However, the signaling connection may be released by the NG-RAN during the progress of a positioning process for a reason of signaling and data inactivation.

An operation process of a network for measuring a location of the UE is described in detail with reference to FIG. 13. In step 1*a*, a 5GC entity such as the GMLC may request a location service for measuring a location of a target UE from a serving AMF. However, even if the GMLC does not request the location service, according to step 1*b*, the serving AMF may also determine that the location service for measuring the location of the target UE is required. For example, in order to measure the location of the UE for emergency call, the serving AMF may also directly determine performing the location service.

Thereafter, the AMF may transmit a location service request to the LMF according to step 2, and the LMF may start location procedures for acquiring location measurement data or location measurement assistance data together with the serving ng-eNB and the serving gNB according to step 3*a*. Additionally, according to step 3*b*, the LMF may start location procedures for downlink positioning together with the UE. For example, the LMF may transmit location assistance data (assistance data defined in 3GPP TS 36.355) to the UE or acquire a location estimation value or a location measurement value. The step 3*b* may be additionally performed after the step 3*a* is performed, but also performed instead of the step 3*a*.

In step 4, the LMF may provide a location service response to the AMF. Further, the location service response may include information about whether the location estimation of the UE is successful, and the location estimation value of the UE. Thereafter, if the procedure of FIG. 13 has been initiated by the step 1*a*, the AMF may transmit the location service response to the 5GC entity, such as the GMLC, and if the procedure of FIG. 13 has been initiated by the step 1*b*, the AMF may use the location service response to provide the location service related to the emergency call.

FIG. 14 illustrates an example of a protocol layer used to support LPP message transmission between an LMF and a UE in accordance with an embodiment of the present disclosure.

An LPP (LTE positioning protocol) PDU may be transmitted via an NAS PDU between the AMF and a UE. Referring to FIG. 14, the LPP may terminate between a target device (e.g., a UE in the control plane or an SUPL enabled terminal (SET) in the user plane) and a location server (e.g., the LMF in the control plane or the SLP in the user plane). An LPP message may be transmitted in a form of a transparent PDU via an intermediate network interface by using an appropriate protocol, such as an NG application protocol (NGAP) via an NG-control plane (NG-C) interface and NAS/RRC via LTE-Uu and NR-Uu interfaces. An LPP protocol enables positioning for NR and LTE by using various positioning methods.

For example, the target device and the location server may exchange capability information, assistance data for positioning, and/or location information between them via the LPP protocol. Further, the target device and the location server may also perform error information exchange and/or a stop indication of an LPP procedure through the LPP message.

FIG. 15 illustrates an example of a protocol layer used to support NRPPa PDU transmission between an LMF and a NG-RAN node in accordance with an embodiment of the present disclosure.

NR positioning protocol A (NRPPa) may be used for information exchange between an NG-RAN node and an LMF. Specifically, the NRPPa may exchange enhanced-cell ID (E-CID) for measurement transmitted to the LMF from the ng-eNB, data for supporting an OTDOA positioning method, a cell-ID and a cell location ID for an NR cell ID positioning method, etc. Even if there is no information on a related NRPPa transaction, the AMF may route NRPPa PDUs based on a routing ID of the related LMF via the NG-C interface.

A procedure of an NRPPa protocol for location and data collection may be categorized into two types. A first type is a UE associated procedure for transmitting information (e.g., location measurement information, etc.) on a specific UE, and a second type is a non-UE associated procedure for transmitting information (e.g., gNB/ng-eNB/TP timing information, etc.) applicable to the NG-RAN node and associated TPs. The two types of procedures may also be independently supported or simultaneously supported.

The positioning methods supported in the NG-RAN may include GNSS, OTDOA, enhanced cell ID (E-CID), air pressure sensor positioning, WLAN positioning, Bluetooth positioning, and a terrestrial beacon system (TBS), an Uplink Time Difference of Arrival (UTDOA), etc. The location of the UE may also be measured using one positioning method of the positioning methods, but the location of the UE may also be measured using two or more positioning methods.

(1) Observed Time Difference of Arrival (OTDOA)

FIG. 16 illustrates an OTDOA positioning method according to an embodiment of the present disclosure.

In the OTDOA positioning method, the UE uses measurement timings of downlink signals received from multiple TPs including eNB, ng-eNB, and PRS dedicated TP. The UE measures timings of the received downlink signals by using location assistance data received from the location server. In addition, the location of the UE may be determined based on this measurement result and geographical coordinates of contiguous TPs.

The UE connected to the gNB may request a measurement gap for OTDOA measurement from the TP. If the UE does not recognize a single frequency network (SFN) for at least one TP within OTDOA assistance data, the UE may use an autonomous gap to acquire an SFN of an OTDOA reference cell before requesting a measurement gap for performing reference signal time difference (RSTD) measurement.

The RSTD may be defined based a smallest relative time difference between boundaries of two subframes respectively received from a reference cell and a measurement cell. That is, the RSTD may be calculated based on a relative time difference between a start time of a subframe received from the measurement cell and a start time of a subframe of a reference cell closest to the start time. The reference cell may be selected by the UE.

For the accurate OTDOA measurement, it is necessary to measure times of arrival (TOAs) of signals received from three or more TPs or BSs which are geographically distributed. For example, the UE may measure TOA for each of TP 1, TP 2, and TP 3, calculate RSTD for TP 1 and TP 2, RSTD for TP 2 and TP 3, and RSTD for TP 3 and TP 1 based on three TOAs, determine geometric hyperbolas based on the RSTDs, and estimate a point, at which the hyperbolas intersect each other, as a location of the UE. In this case, since accuracy and/or uncertainty for each TOA measurement may occur, the estimated location of the UE may be known as a specific range according to the measurement uncertainty.

For example, the RSTD for two TPs may be calculated based on Equation 1.

[Equation 1]

$$RSTDi,1=\frac{\sqrt{(x_t-x_i)^2+(y_t-y_i)^2}}{c}-\frac{\sqrt{(x_t-x_1)^2+(y_t-y_1)^2}}{c}+(T_i-T_1)+(n_i-n_1).$$

Where c is a speed of light, $\{x_t, y_t\}$ is a (unknown) coordinate of a target UE, $\{x_i, y_i\}$ is a (known) coordinate of a TP, and $\{x_1, y_1\}$ is a coordinate of a reference TP (or another TP). And, $(T_i-T_1)$ is a transmission time offset between two TPs and may be referred to as "real time differences (RTDs)", and $n_i$ and $n_1$ may denote values about a UE TOA measurement error.

(2) Enhanced Cell ID (E-CID)

In the cell ID (CID) positioning method, the location of the UE may be measured based on geographical information of a serving ng-eNB, a serving gNB, and/or a serving cell of the UE. For example, the geographical information of the serving ng-eNB, the serving gNB, and/or the serving cell may be acquired through paging, registration, etc.

The E-CID positioning method may use an additional UE measurement and/or NG-RAN radio resource for enhancing a UE location estimation value, in addition to the CID positioning method. In the E-CID positioning method, some of the same measurement methods as a measurement control system of an RRC protocol may be used, but additional measurement is not generally performed only for the location measurement of the UE. In other words, a separate measurement configuration or a measurement control message may not be provided to measure the location of the UE, and the UE may not also expect that an additional measurement operation only for the location measurement is requested, and may generally report a measurement value acquired through measurable measurement methods.

For example, the serving gNB may implement the E-CID positioning method by using an E-UTRA measurement value provided from the UE.

An example of a measurement element which can be used for E-CID positioning may be as follows.

UE measurement: E-UTRA RSRP (Reference Signal Received Power), E-UTRA RSRQ (Reference Signal Received Quality), UE E-UTRA reception-transmission time difference (Rx-Tx Time difference), GERAN (GSM EDGE Random Access Network)/WLAN RSSI (Reference Signal Strength Indication), UTRAN CPICH (Common Pilot Channel) RSCP (Received Signal Code Power), UTRAN CPICH Ec/Io E-UTRAN measurement: ng-eNB reception-transmission time difference (Rx-Tx Time difference), Timing Advance (TADV), Angle of Arrival (AoA)

The TADV may be categorized into Type 1 and Type 2 as below.

TADV Type 1=(ng-eNB Rx-Tx time difference)+(UE E-UTRA Rx-Tx time difference)

TADV Type 2=ng-eNB Rx-Tx time difference

The AoA may be used for measuring a direction of the UE. The AoA may be defined as an estimated angle for the location of the UE counterclockwise from the BS/TP. In this case, a geographical reference direction may be the north. The BS/TP may use an uplink signal such as a sounding reference signal (SRS) and/or a demodulation reference signal (DMRS) for AoA measurement. Further, as arrangement of antenna arrays increases, measurement accuracy of the AoA may become higher, and when the antenna arrays are arranged at the same interval, signals received from contiguous antenna elements may have a predetermined phase-rotate.

(3) Uplink Time Difference of Arrival (UTDOA)

The UTDOA is a method of determining the location of the UE by estimating time of arrival of the SRS. When the estimated time of arrival of the SRS is calculated, the serving cell may be used as the reference cell to estimate the location of the UE through a time difference of arrival from another cell (or BS/TP). In order to implement the UTDOA, the E-SMLC may indicate the serving cell of the target UE in order to indicate the SRS transmission to the target UE. Further, the E-SMLC may provide a configuration such as whether the SRS being periodic/aperiodic, a bandwidth, and frequency/group sequence hopping, etc.

With reference to the standard document, some procedures and technical specifications related to the present disclosure are shown in Table 16 below.

TABLE 16

| 3GPP TS 38.321 V16.2.1 |
|---|

The MAC entity may be configured by RRC with a DRX functionality that controls the UE's PDCCH monitoring activity for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and AI-RNTI. When using DRX operation, the MAC entity shall also monitor PDCCH according to requirements found in other clauses of this specification. When in RRC_CONNECTED, if DRX is configured, for all the activated Serving Cells, the MAC entity may monitor the PDCCH discontinuously using the DRX operation specified in this clause; otherwise the MAC entity shall monitor the PDCCH as specified in TS 38.213 [6].

NOTE 1: If Sidelink resource allocation mode 1 is configured by RRC, a DRX functionality is not configured.

RRC controls DRX operation by configuring the following parameters:

- drx-onDurationTimer: the duration at the beginning of a DRX cycle;
- drx-SlotOffset: the delay before starting the drx-onDurationTimer;
- drx-InactivityTimer: the duration after the PDCCH occasion in which a PDCCH indicates a new UL or DL transmission for the MAC entity;
- drx-RetransmissionTimerDL (per DL HARQ process except for the broadcast process): the maximum duration until a DL retransmission is received;
- drx-RetransmissionTimerUL (per UL HARQ process): the maximum duration until a grant for UL retransmission is received;
- drx-LongCycleStartOffset: the Long DRX cycle and drx-StartOffset which defines the subframe where the Long and Short DRX cycle starts;
- drx-ShortCycle (optional): the Short DRX cycle;
- drx-ShortCycleTimer (optional): the duration the UE shall follow the Short DRX cycle;
- drx-HARQ-RTT-TimerDL (per DL HARQ process except for the broadcast process): the TABLE 16-continued

| 3GPP TS 38.321 V16.2.1 |
| --- |

minimum duration before a DL assignment for HARQ retransmission is expected by the MAC entity;
- drx-HARQ-RTT-TimerUL (per UL HARQ process): the minimum duration before a UL HARQ retransmission grant is expected by the MAC entity;
- ps-Wakeup (optional): the configuration to start associated drx-onDurationTimer in case DCP is monitored but not detected;
- ps-TransmitOtherPeriodicCSI (optional): the configuration to report periodic CSI that is not L1-RSRP on PUCCH during the time duration indicated by drx-onDurationTimer in case DCP is configured but associated drx-onDurationTimer is not started;
- ps-TransmitPeriodicL1-RSRP (optional): the configuration to transmit periodic CSI that is L1-RSRP on PUCCH during the time duration indicated by drx-onDurationTimer in case DCP is configured but associated drx-onDurationTimer is not started.

Serving Cells of a MAC entity may be configured by RRC in two DRX groups with separate DRX parameters. When RRC does not configure a secondary DRX group, there is only one DRX group and all Serving Cells belong to that one DRX group. When two DRX groups are configured, each Serving Cell is uniquely assigned to either of the two groups. The DRX parameters that are separately configured for each DRX group are: drx-onDurationTimer, drx-InactivityTimer. The DRX parameters that are common to the DRX groups are: drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, and drx-HARQ-RTT-TimerUL.

When a DRX cycle is configured, the Active Time for Serving Cells in a DRX group includes the time while:
- drx-onDurationTimer or drx-InactivityTimer configured for the DRX group is running; or
- drx-RetransmissionTimerDL or drx-RetransmissionTimerUL is running on any Serving Cell in the DRX group; or
- ra-ContentionResolutionTimer (as described in clause 5.1.5) or msgB-ResponseWindow (as described in clause 5.1.4a) is running; or
- a Scheduling Request is sent on PUCCH and is pending (as described in clause 5.4.4); or
- a PDCCH indicating a new transmission addressed to the C-RNTI of the MAC entity has not been received after successful reception of a Random Access Response for the Random Access Preamble not selected by the MAC entity among the contention-based Random Access Preamble (as described in clauses 5.1.4 and 5.1.4a).

When DRX is configured, the MAC entity shall:

1> if a MAC PDU is received in a configured downlink assignment:
  2> start the drx-HARQ-RTT-TimerDL for the corresponding HARQ process in the first symbol after the end of the corresponding transmission carrying the DL HARQ feedback;
  2> stop the drx-RetransmissionTimerDL for the corresponding HARQ process.
1> if a MAC PDU is transmitted in a configured uplink grant and LBT failure indication is not received from lower layers:
  2> start the drx-HARQ-RTT-TimerUL for the corresponding HARQ process in the first symbol after the end of the first repetition of the corresponding PUSCH transmission;
  2> stop the drx-RetransmissionTimerUL for the corresponding HARQ process.
1> if a drx-HARQ-RTT-TimerDL expires:
  2> if the data of the corresponding HARQ process was not successfully decoded:
    3> start the drx-RetransmissionTimerDL for the corresponding HARQ process in the first symbol after the expiry of drx-HARQ-RTT-TimerDL.
1> if a drx-HARQ-RTT-TimerUL expires:
  2> start the drx-RetransmissionTimerUL for the corresponding HARQ process in the first symbol after the expiry of drx-HARQ-RTT-TimerUL.
1> if a DRX Command MAC CE or a Long DRX Command MAC CE is received:
  2> stop drx-onDurationTimer for each DRX group;
  2> stop drx-InactivityTimer for each DRX group.
1> if drx-InactivityTimer for a DRX group expires:
  2> if the Short DRX cycle is configured:
    3> start or restart drx-ShortCycleTimer for this DRX group in the first symbol after the expiry of drx-InactivityTimer;
    3> use the Short DRX cycle for this DRX group.
  2> else:
    3> use the Long DRX cycle for this DRX group.
1> if a DRX Command MAC CE is received:
  2> if the Short DRX cycle is configured:
    3> start or restart drx-ShortCycleTimer for each DRX group in the first symbol after the end of DRX Command MAC CE reception;
    3> use the Short DRX cycle for each DRX group.
  2> else:
    3> use the Long DRX cycle for each DRX group.
1> if drx-ShortCycleTimer for a DRX group expires:
  2> use the Long DRX cycle for this DRX group.
1> if a Long DRX Command MAC CE is received:
  2> stop drx-ShortCycleTimer for each DRX group;
  2> use the Long DRX cycle for each DRX group.
1> if the Short DRX cycle is used for a DRX group, and [(SFN × 10) + subframe number] modulo (drx-ShortCycle) = (drx-StartOffset) modulo (drx-ShortCycle):
  2> start drx-onDurationTimer for this DRX group after drx-SlotOffset from the beginning of the subframe.
1> if the Long DRX cycle is used for a DRX group, and [(SFN × 10) + subframe number] modulo (drx-LongCycle) = drx-StartOffset:
  2> if DCP monitoring is configured for the active DL BWP as specified in TS 38.213 [6], TABLE 16-continued

| 3GPP TS 38.321 V16.2.1 |
|---|
| clause 10.3:<br>3> if DCP indication associated with the current DRX cycle received from lower layer indicated to start drx-onDurationTimer, as specified in TS 38.213 [6]; or<br>3> if all DCP occasion(s) in time domain, as specified in TS 38.213 [6], associated with the current DRX cycle occurred in Active Time considering grants/assignments/DRX Command MAC CE/Long DRX Command MAC CE received and Scheduling Request sent until 4 ms prior to start of the last DCP occasion, or within BWP switching interruption length, or during a measurement gap, or when the MAC entity monitors for a PDCCH transmission on the search space indicated by recoverySearchSpaceId of the SpCell identified by the C-RNTI while the ra-ResponseWindow is running (as specified in clause 5.1.4); or<br>3> if ps-Wakeup is configured with value true and DCP indication associated with the current DRX cycle has not been received from lower layers:<br>4> start drx-onDurationTimer after drx-SlotOffset from the beginning of the subframe.<br>2> else:<br>3> start drx-onDurationTimer for this DRX group after drx-SlotOffset from the beginning of the subframe.<br>NOTE 2: In case of unaligned SFN across carriers in a cell group, the SFN of the SpCell is used to calculate the DRX duration.<br>1> if a DRX group is in Active Time:<br>2> monitor the PDCCH on the Serving Cells in this DRX group as specified in TS 38.213 [6];<br>2> if the PDCCH indicates a DL transmission:<br>3> start the drx-HARQ-RTT-TimerDL for the corresponding HARQ process in the first symbol after the end of the corresponding transmission carrying the DL HARQ feedback;<br>NOTE 3: When HARQ feedback is postponed by PDSCH-to-HARQ_feedback timing indicating a non-numerical k1 value, as specified in TS 38.213 [6], the corresponding transmission opportunity to send the DL HARQ feedback is indicated in a later PDCCH requesting the HARQ-ACK feedback.<br>3> stop the drx-RetransmissionTimerDL for the corresponding HARQ process.<br>3> if the PDSCH-to-HARQ_feedback timing indicate a non-numerical k1 value as specified in TS 38.213 [6]:<br>4> start the drx-RetransmissionTimerDL in the first symbol after the PDSCH transmission for the corresponding HARQ process.<br>2> if the PDCCH indicates a UL transmission:<br>3> start the drx-HARQ-RTT-TimerUL for the corresponding HARQ process in the first symbol after the end of the first repetition of the corresponding PUSCH transmission;<br>3> stop the drx-RetransmissionTimerUL for the corresponding HARQ process.<br>2> if the PDCCH indicates a new transmission (DL or UL) on a Serving Cell in this DRX group:<br>3> start or restart drx-InactivityTimer for this DRX group in the first symbol after the end of the PDCCH reception.<br>2> if a HARQ process receives downlink feedback information and acknowledgement is indicated:<br>3> stop the drx-RetransmissionTimerUL for the corresponding HARQ process.<br>1> if DCP monitoring is configured for the active DL BWP as specified in TS 38.213 [6], clause 10.3; and<br>1> if the current symbol n occurs within drx-onDurationTimer duration; and<br>1> if drx-onDurationTimer associated with the current DRX cycle is not started as specified in this clause:<br>2> if the MAC entity would not be in Active Time considering grants/assignments/DRX Command MAC CE/Long DRX Command MAC CE received and Scheduling Request sent until 4 ms prior to symbol n when evaluating all DRX Active Time conditions as specified in this clause:<br>3> not transmit periodic SRS and semi-persistent SRS defined in TS 38.214 [7];<br>3> not report semi-persistent CSI configured on PUSCH;<br>3> if ps-TransmitPeriodicL1-RSRP is not configured with value true:<br>4> not report periodic CSI that is L1-RSRP on PUCCH.<br>3> if ps-TransmitOtherPeriodicCSI is not configured with value true:<br>4> not report periodic CSI that is not L1-RSRP on PUCCH.<br>1> else:<br>2> in current symbol n, if a DRX group would not be in Active Time considering grants/assignments scheduled on Serving Cell(s) in this DRX group and DRX Command MAC CE/Long DRX Command MAC CE received and Scheduling Request sent until 4 ms prior to symbol n when evaluating all DRX Active Time conditions as specified in this clause:<br>3> not transmit periodic SRS and semi-persistent SRS defined in TS 38.214 [7] in this DRX group;<br>3> not report CSI on PUCCH and semi-persistent CSI configured on PUSCH in this DRX group.<br>2> if CSI masking (csi-Mask) is setup by upper layers:<br>3> in current symbol n, if drx-onDurationTimer of a DRX group would not be running considering grants/assignments scheduled on Serving Cell(s) in this DRX group and DRX Command MAC CE/Long DRX Command MAC CE received until 4 ms prior to symbol n when evaluating all DRX Active Time conditions as specified in this clause; and<br>4> not report CSI on PUCCH in this DRX group. |

TABLE 16-continued

| 3GPP TS 38.321 V16.2.1 |
| --- |
| NOTE 4: If a UE multiplexes a CSI configured on PUCCH with other overlapping UCI(s) according to the procedure specified in TS 38.213 [6] clause 9.2.5 and this CSI multiplexed with other UCI(s) would be reported on a PUCCH resource outside DRX Active Time of the DRX group in which this PUCCH is configured, it is up to UE implementation whether to report this CSI multiplexed with other UCI(s). |
| Regardless of whether the MAC entity is monitoring PDCCH or not on the Serving Cells in a DRX group, the MAC entity transmits HARQ feedback, aperiodic CSI on PUSCH, and aperiodic SRS defined in TS 38.214 [7] on the Serving Cells in the DRX group when such is expected. |
| The MAC entity needs not to monitor the PDCCH if it is not a complete PDCCH occasion (e.g. the Active Time starts or ends in the middle of a PDCCH occasion). |

<Contents Related to the Present Disclosure>

Release 17 NR V2X supports a sidelink discontinuous reception (SL DRX) operation. Embodiments of the present disclosure relate to an SL DRX operation of a sidelink resource pool based UE. The SL DRX operation of the sidelink resource pool based UE may be as follows.

Embodiment 1

According to an embodiment of the present disclosure, a sidelink resource pool may be configured with a resource pool in which an SL DRX operation is supported and a resource pool in which the SL DRX operation is not supported. For example, the resource pool in which the SL DRX operation is supported may include a sidelink Tx pool and a sidelink Rx pool for UEs supporting the SL DRX operation among R17 UEs. The resource pool in which the SL DRX operation is not supported may include a sidelink Tx pool and a sidelink Rx pool for UEs not supporting the SL DRX operation among the R17 UEs, and a sidelink Tx pool and a sidelink Rx pool for R16 UEs.

Embodiment 2

According to an embodiment of the present disclosure, in sidelink unicast, a Tx UE may transmit sidelink Tx pool information to an Rx UE. A sidelink unicast connection may be configured between the Tx UE and the Rx UE. The sidelink Tx pool information may include information on a Tx pool that the Tx UE selects and uses for sidelink transmission.

The sidelink Tx pool information may include 1) information on a sidelink Tx pool to be used by the Tx UE for sidelink transmission, 2) information on whether the sidelink Tx pool is a pool supporting an SL DRX operation or a pool not supporting the SL DRX operation, 3) Tx profile information linked to the sidelink Tx pool or QoS profile information linked to the sidelink Tx pool, 4) PC5 unicast link information to which the sidelink Tx pool is applied or groupcast/broadcast service information to which the sidelink Tx pool is applied, and 5) SL DRX configuration information linked to the sidelink Tx pool.

1) The information on the sidelink Tx pool to be used by the Tx UE for sidelink transmission may include information on a sidelink Tx pool to be used by the Tx UE for unicast transmission or information on a sidelink Tx pool to be used by the Tx UE for groupcast/broadcast transmission. In 3) the Tx profile information linked to the sidelink Tx pool or the QoS profile information linked to the sidelink Tx pool, the Tx profile information linked to the sidelink Tx pool may include information related to whether a sidelink service or destination L2 ID supports the SL DRX operation, and the QoS profile information linked to the sidelink Tx pool may be, for example, PQI (PC5 5QI). In 4) the PC5 unicast link information to which the sidelink Tx pool is applied or the groupcast/broadcast service information to which the sidelink Tx pool is applied, the PC5 unicast link information to which the sidelink Tx pool is applied may include a pair of source L2 ID and/or PC5 link ID, and the groupcast/broadcast service information to which the sidelink Tx pool is applied may be, for example, a destination L2 ID. 5) The SL DRX configuration information linked to the sidelink Tx pool may include, for example, SL discontinuous configuration information used in the sidelink Tx pool.

In the present disclosure, sidelink discontinuous reception (SL DRX) configuration may include at least one of SL drx-onDuration Timer, SL drx-SlotOffset, SL drx-Inactivity Timer, SL drx-StartOffset, SL drx-Cycle, SL drx-HARQ-RTT-Timer, or SL drx-Retransmission Timer. The SL drx-onDurationTimer may be a duration when a sidelink discontinuous cycle starts. The SL drx-SlotOffset may be a delay before the SL drx-onDurationTimer starts. The SL drx-Inactivity Timer may be a duration after PSCCH generation when the PSCCH represents a new sidelink transmission for an MAC entity. The SL drx-StartOffset may be a subframe in which an SL DRX cycle is started. The SL DRX cycle may be a sidelink cycle. The SL drx-HARQ-RTT-Timer may be a timer per HARQ process or a timer per sidelink process and may be a minimum duration before allocation for HARQ retransmission is expected by the MAC entity. The SL drx-RetransmissionTimer may be a timer per HARQ process or a timer per sidelink process and may be a maximum duration until retransmission is received.

The Tx UE may transmit the sidelink Tx pool information to the Rx UE via a PC5 RRC message or a sidelink MAC control element (CE). The Tx UE may transmit the sidelink Tx pool information to the Rx UE based on a sidelink capability negotiation process, PC5 RRC reconfiguration, or sidelink discontinuous reception (SL DRX) configuration. The Tx UE may transmit PSCCH and PSSCH to the Rx UE via the sidelink Tx pool.

The Rx UE may receive the sidelink Tx pool information from the Tx UE. The Rx UE may acquire information on a Tx pool that the Tx UE will use for sidelink transmission based on the sidelink Tx pool information. The Rx UE may select an Rx pool corresponding to the Tx pool. The Rx pool may correspond one-to-one to the Tx pool. The Rx UE may receive the sidelink from the Tx UE based on the Rx pool. For example, the Rx UE may receive the PSCCH and the PSSCH from the Tx UE based on the Rx pool.

In the present disclosure, an SL DRX timer may include an SL DRX Onduration timer, an SL DRX inactivity timer, an SL DRX HARQ RTT (round trip time) timer, and an SL DRX retransmission timer.

The SLDRX Onduration timer may be a duration in which a UE performing a SL DRX operation shall basically operate in active time to so as receive PSCCH/PSSCH of other UE.

The SL DRX inactivity timer may be a duration in which the duration of the SL DRX Onduration timer is extended. That is, the duration of the SL DRX Onduration timer may be extended as much as the duration of the SL DRX inactivity timer. Further, if a UE receives a new packet (e.g., transmitted via a new PSSCH) from other UE, the UE may run the SL DRX inactivity timer and extend the SL DRX Onduration timer.

The SL DRX HARQ RTT timer may be a duration in which a UE performing the sidelink DRX operation operates in a sleep mode until the UE receives a retransmission packet (or PSSCH allocation) from other UE. If the UE runs the SL DRX HARQ RTT timer, the UE may determine that the other UE will not transmit a sidelink retransmission packet to the UE until the SL DRX HARQ RTT timer expires. The UE may operate in the sleep mode during the corresponding timer.

The SL DRX retransmission timer may be a duration in which a UE performing the sidelink DRX operation operates in active time until receiving a retransmission packet (or PSSCH allocation) transmitted by other UE. During a duration of the corresponding timer duration, the UE may monitor reception of a retransmission sidelink packet (or PSSCH allocation) transmitted by the other UE.

In the present disclosure, a Uu DRX timer may include a drx-HARQ-RTT-TimerSL timer and a drx-Retransmission TimerSL timer.

The drx-HARQ-RTT-TimerSL timer may be a duration in which the Tx UE performing sidelink communication based on sidelink transmission mode 1 does not monitor a PDDCH (or DCI) in order to be allocated resources from a base station. The Tx UE may support a Uu DRX operation.

The drx-RetransmissionTimerSL timer may be a duration in which the Tx UE performing sidelink communication based on sidelink transmission mode 1 monitors a PDDCH (or DCI) in order to be allocated resources from a base station. The Tx UE may support a Uu DRX operation.

In the present disclosure, the names of the timers (e.g., SL DRX Onduration timer, SL DRX inactivity timer, SL DRX HARQ RTT timer, or SL DRX retransmission timer, etc.) are merely an example, and timers performing the same/similar functions based on the content described for each timer may be considered as the same or similar timers regardless of their names.

The present disclosure can be applied and extended as a method of solving a problem of loss due to interruption occurring during Uu BWP switching.

The present disclosure can be applied and extended as a method of solving a problem of loss due to interruption occurring during sidelink multiple BWP switching when the UE supports sidelink multiple BWP.

According to the embodiments 1 and 2 of the present disclosure, the Rx UE performing the SL DRX operation does not perform the sidelink operation while monitoring all the Rx pools configured for a sidelink data monitoring operation, and can perform the SL DRX operation based on the Rx pool matched to the Tx pool transmitted by the Tx UE, thereby reducing power usage.

The present disclosure can be extended and applied to not only default/common SL DRX configuration, default/common SL DRX pattern, or parameters and timers included in default/common SL DRX configuration, but also UE-pair specific SL DRX configuration, UE-pair specific SL DRX pattern, or parameters and timers included in UE-pair specific SL DRX configuration. In the present disclosure, "Onduration" may be extended and interpreted as a duration of the active time, and "Offduration" may be extended and interpreted as a duration of the sleep time. The active time may be a duration in which the UE operates in a wake up state (RF module is in "On" state) to receive and transmit a radio signal, and the sleep time may be a duration in which the UE operates in a sleep state (RF module is in "Off" state) for power saving. This may not mean that the Tx UE shall compulsorily operate in the sleep mode in the sleep time duration. If necessary, even in the sleep time, the UE may be allowed to operate in the active time for a while for the sensing operation/transmission operation. Whether to apply embodiments of the present disclosure and/or the related parameters (e.g., threshold) may be configured based on a resource pool, a congestion level, a service priority (and/or type), QoS requirements (e.g., latency and/or reliability) or PQI, a traffic type (e.g., periodic generation and/or aperiodic generation), a sidelink transmission mode (e.g., mode 1 and/or mode 2), and the like.

For example, whether to apply embodiments of the present disclosure (and/or related parameter setting values) may be configured for at least one of a resource pool, a service/packet type (and/or priority), QoS requirements (e.g., URLLC/EMBB traffic, latency, and/or reliability), PQI, PFI, a cast type (e.g. unicast, groupcast, and/or broadcast), a congestion level (e.g. CBR), a sidelink HARQ feedback scheme (e.g., NACK Only Feedback, ACK/NACK Feedback), a case of transmission of HARQ feedback enabled MAC PDU (and/or HARQ feedback disabled MAC PDU), whether to configure a PUCCH based sidelink HARQ feedback reporting operation, a case of performing pre-emption (and/or re-evaluation) or pre-emption (and/or re-evaluation based resource reselection), L1 source ID and/or destination ID (or L2 source ID and/or destination ID), L1 source layer ID and/or destination layer ID (or L2 source layer ID and/or destination layer ID), a pair of L1 source layer IDs and/or a direction of destination layer ID and a cast type of combination ID (or a pair of L2 source layer IDs and/or a direction of destination layer ID and a cast type of combination ID), a direction of L1 source ID and/or destination ID (or a direction of L2 source ID and/or destination ID), PC5 RRC connection/link, a case of performing SL DRX operation, sidelink transmission mode (mode 1 and/or mode 2), and/or a case of performing periodic/aperiodic resource reservation.

In the present disclosure, a predetermined time may refer to time operating as the active time as much as a predefined time for a UE to receive sidelink signals and/or sidelink data from other UE, and/or time operating as the active time as much as the time of a specific timer (e.g., SL DRX retransmission timer, SL DRX inactivity timer, and/or a timer that guarantees that the DRX operation of the Rx UE can operate in the active time). The embodiments of the present disclosure (and/or related parameter setting values) can also be applied to mmWave sidelink operation.

FIG. 17 is a flow chart illustrating an operation method of a UE according to an embodiment of the present disclosure.

Referring to FIG. 17, a first UE may configure a connection with a second UE, in S1710. The first UE may configure a unicast connection or a PC5 RRC connection with the second UE. One of the first UE or the second UE may support a sidelink discontinuous reception (SL DRX) operation.

The first UE may transmit sidelink transmission pool information to the second UE, in S1720. The sidelink transmission pool information may include information on a sidelink transmission pool. The sidelink transmission pool information may further include at least one of whether the sidelink transmission pool supports a discontinuous reception (DRX), transmission profile information linked to the sidelink transmission pool or QoS profile information linked to the sidelink transmission pool, unicast link information, groupcast service information or broadcast service information to which the sidelink transmission pool is applied, or DRX configuration information linked to the sidelink transmission pool.

The first UE may transmit the sidelink transmission pool information to the second UE based on a PC5 RRC message or a sidelink MAC CE. Alternatively, the first UE may transmit the sidelink transmission pool information to the second UE based on sidelink capability negotiation, PC5 RRC reconfiguration, or SL DRX configuration.

The SL DRX configuration may include at least one of SL drx-onDurationTimer, SL drx-SlotOffset, SL drx-Inactivity-Timer, SL drx-StartOffset, SL drx-Cycle, SL drx-HARQ-RTT-Timer, or SL drx-Retransmission Timer.

The first UE may transmit a PSCCH to the second UE based on the sidelink transmission pool, in S1730. The first UE may transmit a PSSCH to the second UE based on the sidelink transmission pool, in S1740.

FIG. 18 is a flow chart illustrating an operation method of a UE according to an embodiment of the present disclosure.

Referring to FIG. 18, a first UE may perform a connection with a second UE, in S1810. One of the first UE or the second UE may support a discontinuous reception (DRX) operation.

The first UE may configure a unicast connection or a PC5 RRC connection with the second UE. One of the first UE or the second UE may support a sidelink discontinuous reception (SL DRX) operation.

The first UE may receive sidelink transmission pool information from the second UE, in S1820. The sidelink transmission pool information may include information on a sidelink transmission pool. The sidelink transmission pool information may further include at least one of whether the sidelink transmission pool supports a discontinuous reception (DRX), transmission profile information linked to the sidelink transmission pool or QoS profile information linked to the sidelink transmission pool, unicast link information, groupcast service information or broadcast service information to which the sidelink transmission pool is applied, or DRX configuration information linked to the sidelink transmission pool.

The first UE may receive the sidelink transmission pool information from the second UE based on a PC5 RRC message or a sidelink MAC CE. Alternatively, the first UE may receive the sidelink transmission pool information from the second UE based on sidelink capability negotiation, PC5 RRC reconfiguration, or SL DRX configuration.

The SL DRX configuration may include at least one of SL drx-onDurationTimer, SL drx-SlotOffset, SL drx-Inactivity-Timer, SL drx-StartOffset, SL drx-Cycle, SL drx-HARQ-RTT-Timer or SL drx-Retransmission Timer.

The first UE may select a sidelink reception pool, in S1830. The first UE may acquire information on the sidelink transmission pool based on the sidelink transmission pool information. The sidelink transmission pool may be a transmission pool used by the second UE for sidelink transmission. The first UE may select the sidelink reception pool corresponding to the sidelink transmission pool. The sidelink reception pool may correspond one-to-one to the sidelink transmission pool.

The first UE may receive a PSCCH from the second UE based on the sidelink reception pool, in S1840. The first UE may receive a PSSCH from the second UE based on the sidelink reception pool, in S1850.

Various embodiments of the present disclosure can be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 19 illustrates a communication system 1 based on an embodiment of the present disclosure.

An embodiment of FIG. 19 can be combined with various embodiments of the present disclosure.

Referring to FIG. 19, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an extended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless communication technology implemented in the wireless devices 100*a* to 100*f* according to the present disclosure may include a narrowband Internet of Things for low power communication as well as LTE, NR, and 6G. For example, NB-IoT technology may be an example of low power wide area network (LPWAN) technology and may be implemented in standards such as LTE Cat NB1 and/or LTE Cat NB2, and is not limited to the above-mentioned names. Additionally or alternatively, the wireless communication technology implemented in the wireless devices 100*a* to 100*f* according to the present disclosure may perform communication based on the LTE-M technology. In this case, according to an embodiment, the LTE-M technology may be an example of the LPWAN technology and may be called by various names such as enhanced machine type communication (eMTC). For example, the LTE-M technology may be implemented by at least one of various standards such as 1) LTE CAT 0, 2) LTE Cat M1, 3) LTE Cat M2, 4) LTE non-BL (non-Bandwidth Limited), 5) LTE-MTC, 6) LTE machine type communication, and/or 7) LTE M, and is not limited to the above-mentioned names. Additionally or alternatively, the wireless communication technology implemented in the wireless devices 100*a* to 100*f* according to the present disclosure may include at least one of ZigBee considering low power communication, Bluetooth, and a low power wide area network, (LPWAN), and is not limited to the above-mentioned names. According to an embodiment, the ZigBee technology may create personal area networks (PAN) related to small/low power digital communications based on various standards such as IEEE 802.15.4, and may be called by various names.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

FIG. 20 illustrates wireless devices based on an embodiment of the present disclosure.

An embodiment of FIG. 20 can be combined with various embodiments of the present disclosure.

Referring to FIG. 20, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 19.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) based on the descriptions, functions, procedures, proposals, methods, and/or operational flowcharts disclosed in this document. The one or more processors 102 and 202 may generate messages, control information, data, or information based on the descriptions, functions, procedures, proposals, methods, and/or operational flowcharts disclosed in this document. The one or more processors 102 and 202 may generate signals (e.g., baseband signals) including PDUs, SDUs, messages, control information, data, or information based on the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information based on the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located inside and/or outside the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

FIG. 21 illustrates a signal process circuit for a transmission signal based on an embodiment of the present disclosure.

An embodiment of FIG. 21 can be combined with various embodiments of the present disclosure.

Referring to FIG. 21, a signal processing circuit 1000 may include scramblers 1010, modulators 1020, a layer mapper 1030, a precoder 1040, resource mappers 1050, and signal generators 1060. An operation/function of FIG. 21 may be performed, without being limited to, the processors 102 and 202 and/or the transceivers 106 and 206 of FIG. 16. Hardware elements of FIG. 21 may be implemented by the processors 102 and 202 and/or the transceivers 106 and 206 of FIG. 20. For example, blocks 1010 to 1060 may be implemented by the processors 102 and 202 of FIG. 20. Alternatively, the blocks 1010 to 1050 may be implemented by the processors 102 and 202 of FIG. 20 and the block 1060 may be implemented by the transceivers 106 and 206 of FIG. 20.

Codewords may be converted into radio signals via the signal processing circuit 1000 of FIG. 21. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 21. For example, the wireless devices (e.g., 100 and 200 of FIG. 20) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

FIG. 22 illustrates another example of a wireless device based on an embodiment of the present disclosure.

The wireless device may be implemented in various forms based on a use-case/service. The embodiments of FIG. 22 may be combined with various embodiments of the present disclosure.

Referring to FIG. 22, wireless devices 100 and 200 may correspond to the wireless devices 100 and 200 of FIG. 20 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 16. For example, the transceiver(s) 114 may include the one or more transceivers 106 and 206 and/or the one or more antennas 108 and 208 of FIG. 16. The control unit 120 is electrically connected to the communication unit 110, the memory 130, and the additional components 140 and controls overall operation of the wireless devices. For example, the control unit 120 may control an electric/mechanical device based on operation of the wireless programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured based on types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 19), the vehicles (100*b*-1 and 100*b*-2 of FIG. 19), the XR device (100*c* of FIG. 19), the hand-held device (100*d* of FIG. 15), the home appliance (100*e* of FIG. 19), the IoT device (100*f* of FIG. 15), a digital broadcast terminal, a hologram device, a public safety device, an MTC device, a medicine device, a fintech device (or a finance device), a security device, a climate/environment device, the AI server/device (400 of FIG. 19), the BSs (200 of FIG. 19), a network node, etc. The wireless device may be used in a mobile or fixed place based on a use-example/service.

In FIG. 22, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 22 will be described in detail with reference to the drawings.

FIG. 23 illustrates a hand-held device based on an embodiment of the present disclosure.

The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT). The embodiments of FIG. 23 may be combined with various embodiments of the present disclosure.

Referring to FIG. 23, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 22, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

FIG. 24 illustrates a vehicle or an autonomous vehicle based on an embodiment of the present disclosure.

The vehicle or autonomous vehicle may be implemented by a mobile robot, a car, a train, a manned/unmanned Aerial Vehicle (AV), a ship, etc. The embodiments of FIG. 24 may be combined with various embodiments of the present disclosure.

Referring to FIG. 20, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 18, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a location module, a vehicle forward/backward sensor, a battery sensor, a fuel sensor, a tire sensor, a steering sensor, a temperature sensor, a humidity sensor, an ultrasonic sensor, an illumination sensor, a pedal location sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path based on the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by subsequent amendment after the application is filed.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memories may be located inside or outside the processors and may transmit and receive data to/from the processors via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The invention claimed is:

1. A method performed by a first user equipment (UE), the method comprising:

receiving, from a second UE, sidelink transmission pool information including information on a sidelink transmission pool;

selecting a sidelink reception pool related to the sidelink transmission pool based on the sidelink transmission pool information;

receiving a physical sidelink control channel (PSCCH) from the second UE based on the sidelink reception pool; and receiving a physical sidelink shared channel (PSSCH) from the second UE based on the sidelink reception pool, wherein one of the sidelink transmission pool or the sidelink reception pool supports a discontinuous reception (DRX) operation, and wherein the sidelink reception pool corresponds to the sidelink transmission pool in a one-to-one manner.

2. The method of claim 1, further comprising:

configuring a unicast connection or a PC5 radio resource control (RRC) connection with the second UE.

3. The method of claim 1, wherein receiving the sidelink transmission pool information from the second UE comprises receiving the sidelink transmission pool information from the second UE based on a PC5 RRC message or a sidelink MAC control element (CE).

4. The method of claim 1, wherein receiving the sidelink transmission pool information from the second UE comprises receiving the sidelink transmission pool information from the second UE based on a sidelink capability negotiation, a PC5 RRC reconfiguration, or a sidelink DRX configuration.

5. The method of claim 4, wherein the sidelink DRX configuration includes at least one of SL drx-onDurationTimer, SL drx-SlotOffset, SL drx-InactivityTimer, SL drx-StartOffset, SL drx-Cycle, SL drx-HARQ-RTT-Timer or SL drx-RetransmissionTimer.

6. The method of claim 1, wherein the sidelink transmission pool information further includes at least one of whether the sidelink transmission pool supports a discontinuous reception (DRX), transmission profile information linked to the sidelink transmission pool or quality of service (QoS) profile information linked to the sidelink transmission pool, unicast link information, groupcast service information or broadcast service information to which the sidelink transmission pool is applied, or DRX configuration information linked to the sidelink transmission pool.

7. A first user equipment (UE) comprising:

one or more transceivers;

one or more processors configured to control the one or more transceivers; and a memory including one or more instructions performed by the one or more processors, wherein the one or more instructions comprise:

receiving, from a second UE, sidelink transmission pool information including information on a sidelink transmission pool;

selecting a sidelink reception pool related to the sidelink transmission pool based on the sidelink transmission pool information;

receiving a physical sidelink control channel (PSCCH) from the second UE based on the sidelink reception pool; and receiving a physical sidelink shared channel (PSSCH) from the second UE based on the sidelink reception pool, wherein one of the sidelink transmission pool or the sidelink reception pool supports a discontinuous reception (DRX) operation, and wherein the sidelink reception pool corresponds to the sidelink transmission pool in a one-to-one manner.

8. The first UE of claim 7, wherein the one or more instructions further comprise configuring a unicast connection or a PC5 radio resource control (RRC) connection with the second UE.

9. The first UE of claim 7, wherein receiving the sidelink transmission pool information from the second UE comprises receiving the sidelink transmission pool information from the second UE based on a PC5 RRC message or a sidelink MAC control element (CE).

10. The first UE of claim 7, wherein receiving the sidelink transmission pool information from the second UE comprises receiving the sidelink transmission pool information from the second UE based on a sidelink capability negotiation, a PC5 RRC reconfiguration, or a sidelink DRX configuration.

11. The first UE of claim 10, wherein the sidelink DRX configuration includes at least one of SL drx-onDurationTimer, SL drx-SlotOffset, SL drx-InactivityTimer, SL drx-StartOffset, SL drx-Cycle, SL drx-HARQ-RTT-Timer or SL drx-RetransmissionTimer.

12. The first UE of claim 7, wherein the sidelink transmission pool information further includes at least one of whether the sidelink transmission pool supports a discontinuous reception (DRX), transmission profile information linked to the sidelink transmission pool or quality of service (QoS) profile information linked to the sidelink transmission pool, unicast link information, groupcast service information or broadcast service information to which the sidelink transmission pool is applied, or DRX configuration information linked to the sidelink transmission pool.

* * * * *